United States Patent [19]
Bradley et al.

[11] Patent Number: 5,329,760
[45] Date of Patent: Jul. 19, 1994

[54] SELF-SUSTAINING FUEL PURGING FUEL INJECTION SYSTEM

[75] Inventors: Jerome R. Bradley; Theodore R. Koblish, both of Holland, Mich.

[73] Assignee: Fuel Systems Textron, Inc., Zeeland, Mich.

[21] Appl. No.: 159,949

[22] Filed: Nov. 30, 1993

Related U.S. Application Data

[60] Continuation of Ser. No. 61,622, May 13, 1993, abandoned, which is a division of Ser. No. 885,499, May 19, 1992, Pat. No. 5,277,023, which is a continuation-in-part of Ser. No. 772,490, Oct. 7, 1991, abandoned.

[51] Int. Cl.$^5$ ............................................. F02G 3/00
[52] U.S. Cl. ............................................. 60/39.06
[58] Field of Search ............... 60/39.06, 39.094, 734, 60/739, 740; 239/119, 499

[56] References Cited

U.S. PATENT DOCUMENTS

| | | | |
|---|---|---|---|
| 2,480,019 | 8/1949 | Grimmeisen | 158/77 |
| 2,712,218 | 7/1955 | Ritter | 60/39.09 |
| 2,806,354 | 9/1957 | Cook | 60/739 |
| 2,846,845 | 8/1958 | Parker | 60/39.09 |
| 2,949,736 | 8/1960 | Rubbra | 60/39.32 |
| 2,970,772 | 2/1961 | Boosinger et al. | 239/105 |
| 3,016,705 | 1/1962 | Kneidl et al. | 60/39.74 |
| 3,213,918 | 10/1965 | Rudzki et al. | 158/11 |
| 3,344,602 | 10/1967 | Davies et al. | 60/39.28 |
| 3,521,824 | 7/1970 | Wilcox | 239/424.5 |
| 3,541,788 | 11/1970 | Schutz | 60/39.09 |
| 3,684,186 | 8/1972 | Helmrich | 239/400 |
| 4,028,888 | 6/1977 | Pilarczyk | 60/39.32 |
| 4,041,695 | 8/1977 | Harper et al. | 60/39.02 |
| 4,066,386 | 1/1978 | Johnson et al. | 417/199 |
| 4,170,108 | 10/1979 | Mobsby | 60/39.74 |
| 4,229,944 | 10/1980 | Weiler | 60/740 |
| 4,385,489 | 5/1983 | Abbott | 60/39.06 |
| 4,423,595 | 1/1984 | McLean | 60/261 |
| 4,464,901 | 8/1984 | Kobayashi et al. | 60/606 |
| 4,903,478 | 2/1990 | Sato et al. | 60/739 |
| 4,964,270 | 10/1990 | Taylor et al. | 60/39.094 |
| 4,984,424 | 1/1991 | Shekleton | 60/39.94 |
| 5,243,816 | 9/1993 | Huddas | 60/39.094 |

FOREIGN PATENT DOCUMENTS 0132213  1/1985  European Pat. Off. .............. 60/740

OTHER PUBLICATIONS

Drawings A and B of gas turbine engines made by Pratt & Whitney Aircraft, United Technologies Corp.

Primary Examiner—Richard Bertsch
Assistant Examiner—Michael I. Kocharov
Attorney, Agent, or Firm—Flynn, Thiel, Boutell & Tanis

[57] ABSTRACT

A fuel-injector system for a combustor of a gas turbine engine includes first and second fuel injectors rendered operative to discharge fuel to the combustor during a high power regime of engine operation and rendered non-operative during a lower power regime of engine operation. The first and second fuel injectors include respective first and second fuel discharge passages in fuel flow communication to one another and to the combustor via associated fuel discharge lips to sustain a flame region. The first and second fuel injectors are operatively associated with respective first and second air discharge means having air discharge lips for discharging air to the combustor for sustaining the flame region therein.

6 Claims, 11 Drawing Sheets

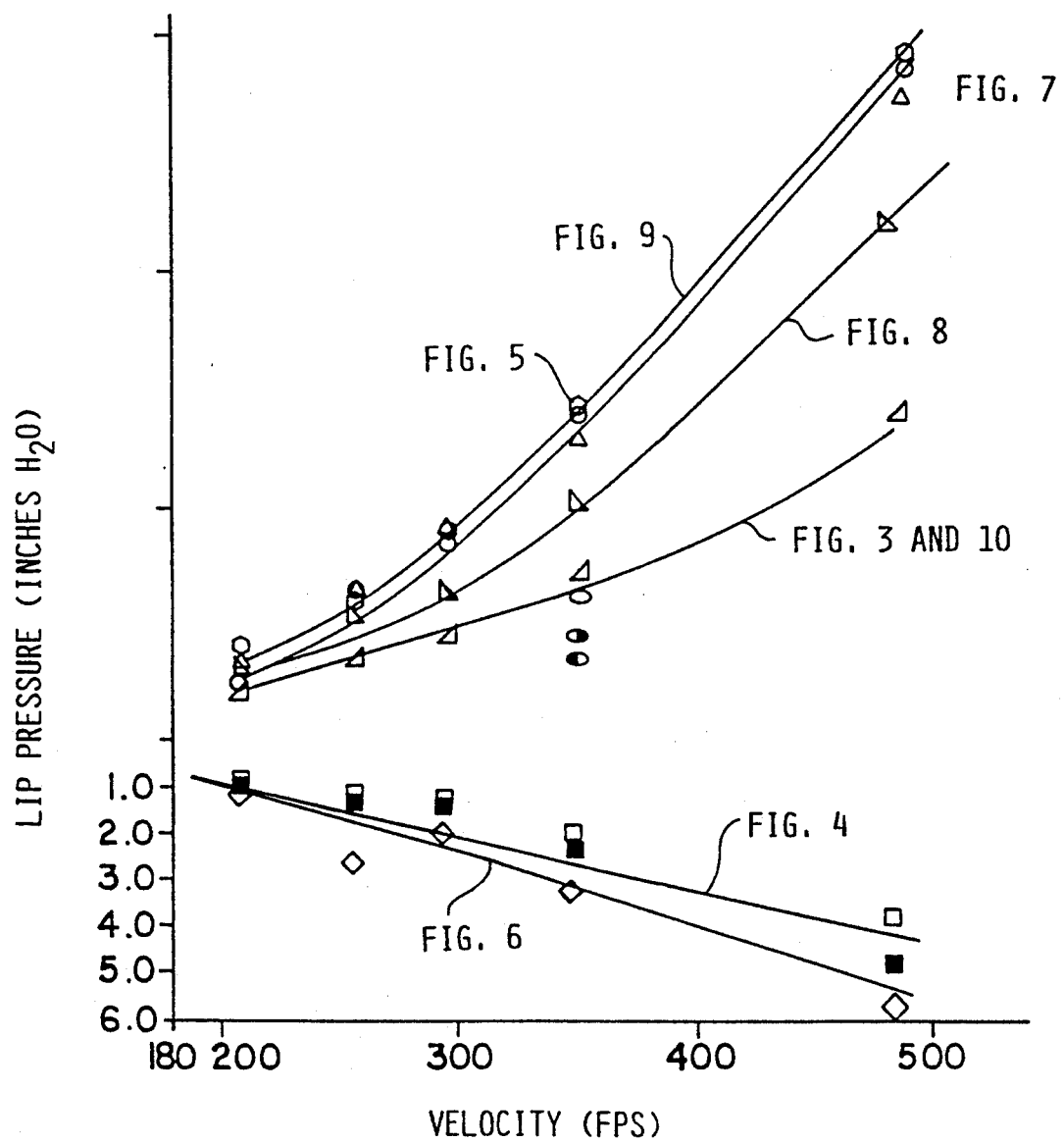

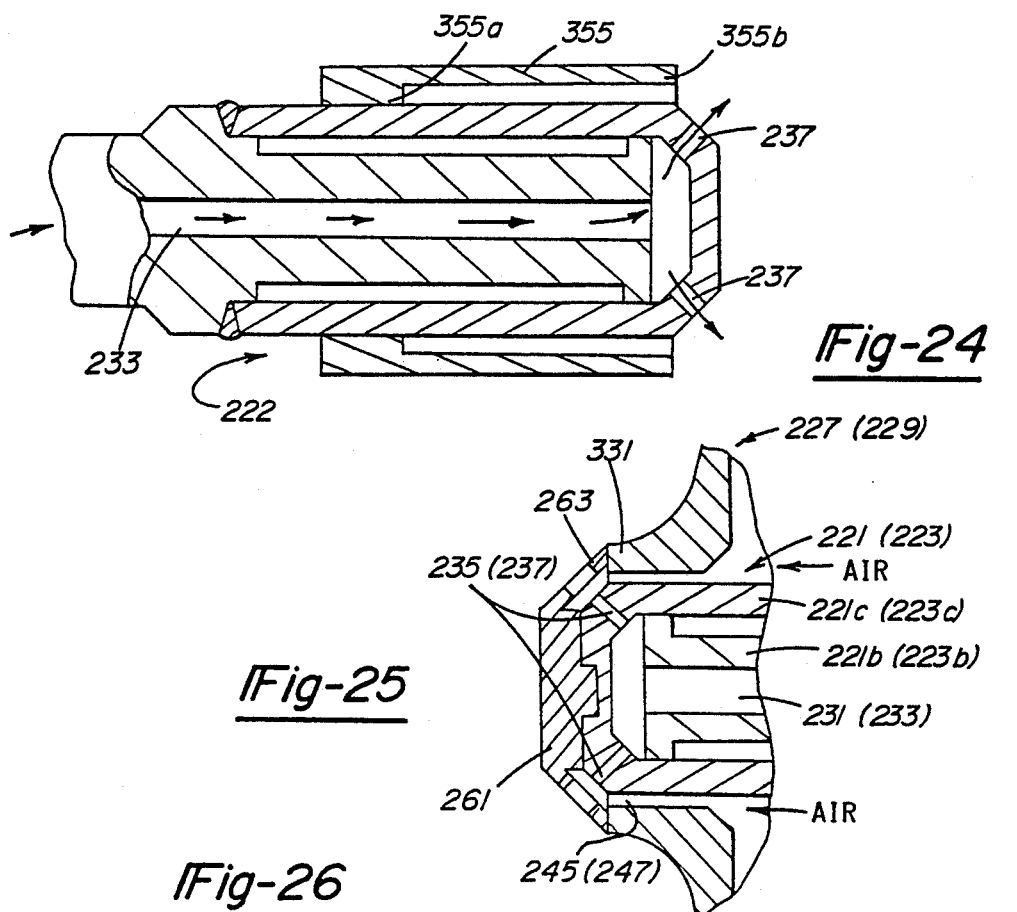
*Fig-24*
*Fig-25*
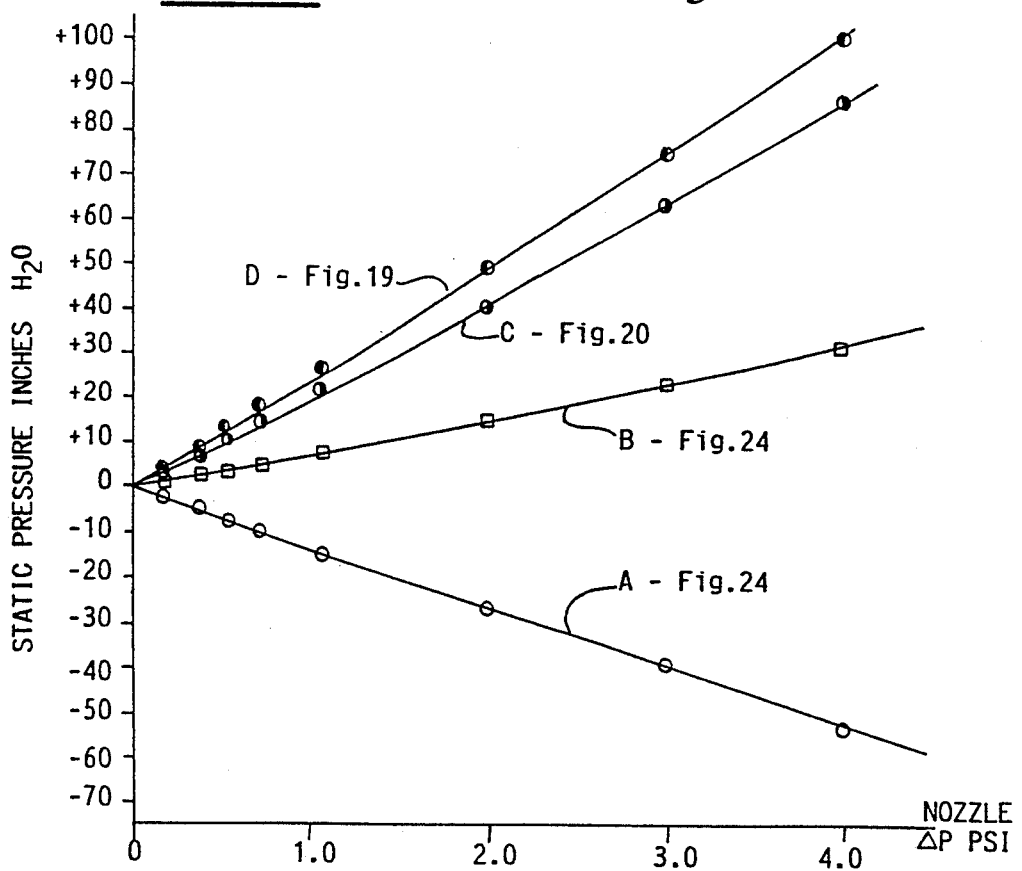
*Fig-26*

SELF-SUSTAINING FUEL PURGING FUEL INJECTION SYSTEM

This application is a continuation of U.S. Ser. No. 08/061,622, filed May 13, 1993 now abandoned, which is a division of U.S. Ser. No. 07/885,499, filed May 19, 1992 now U.S. Pat. No. 5,277,023 which is a continuation-in-part of U.S. Ser. No. 772,490 filed Oct. 7, 1991 now abandoned.

FIELD OF THE INVENTION

The present invention relates to a fuel injector system for a combustor of a gas turbine engine.

BACKGROUND OF THE INVENTION

Efforts to reduce emissions and improve combustor performance in gas turbine engines have brought about the use of staged fuel systems wherein one or more fuel injectors are used for low speed (low power) engine operation and one or more other fuel injectors are used for higher speed (higher power) engine operation. The fuel injectors used for low speed engine operation are commonly referred to as pilot or primary fuel injectors for providing a continuous fuel flow to the engine combustor for all regimes of engine operation from idle to high speed operation. The fuel injectors used for higher speed engine operation are referred to as secondary or main injectors for providing supplemental fuel flow to the engine combustor in an on-demand manner when higher engine speed (power) is required. The secondary fuel injectors thus are rendered non-operative during idle operation of the engine when the supplemental fuel flow is not needed and are rendered operative during higher speed (power) engine operation when supplemental fuel flow is required.

Airblast fuel injectors have been used in non-staged gas turbine engine fuel systems and are described in the Helmrich U.S. Pat. No. 3,864,186 issued Aug. 16, 1972 and the Simmons U.S. Pat. No. 3,980,233 issued Sep. 14, 1976. Airblast fuel injectors are designed to achieve atomization of a film of liquid fuel formed on a fuel discharge orifice surface or lip by directing high velocity airflow supplied to the injector from the engine compressor at the fuel film as it leaves the orifice surface.

Airblast fuel injectors have been proposed for use in a staged gas turbine engine fuel system. However, use of airblast fuel injectors in a staged fuel system may present a so-called coking problem when the airblast fuel injectors comprise the secondary (or main) injectors of the system that are rendered non-operative during some engine operational regimes (e.g., low power regime such as low speed idle operation) and operative during other engine operational regimes (e.g., high speed operation). In particular, when the secondary (or main) fuel injectors are rendered non-operative during low power engine operation, fuel remains in the fuel discharge passages of the injectors and can be heated by the elevated temperature of the combustor environment to the extent that the fuel in the fuel discharge passages is carbonized (coked) over time, building up carbonaceous deposits therein. These deposits can adversely affect the performance of the airblast fuel injector in service from the standpoint that injector fuel flow rate and fuel atomization become unsatisfactory. Similar deposits may build-up in the fuel passages of other air atomizing fuel injectors that employ high velocity compressor airflow to atomize fuel discharged from a fuel discharge passage/lip.

It is an object of the present invention to provide a fuel/air injector system for a combustor of a gas turbine engine wherein the fuel residing in the fuel passages of the fuel injectors upon interruption in the supply of fuel thereto is purged to the combustor as a result of a pneumatic pressure differential established on the resident fuel.

It is another object of the present invention to provide a fuel/air injector system for a combustor of a gas turbine engine wherein the fuel residing in the fuel passages of the fuel injectors upon interruption in the supply of fuel thereto is purged to the combustor rapidly enough that the purged fuel is ignited by the existing flame region in the combustor.

SUMMARY OF THE INVENTION

The present invention contemplates a fuel/air injector system for a combustor of a gas turbine engine wherein the system includes first and second fuel injector means for discharging fuel to the combustor and first and second air injector means cooperably associated with the first and second fuel injector means for discharging pressurized air (e.g., compressor discharge air) to the combustor. In accordance with the invention, the first and second fuel injector means are interconnected in fuel flow relation and the first fuel injector means and associated air injector means and second fuel injector means associated air injector means are operative to establish a pneumatic pressure differential on fuel residing in the interconnected fuel injector means effective, in the event fuel supply to the fuel injector means is interrupted, to purge the resident fuel to the combustor when the fuel supply is interrupted.

In one embodiment of the invention, first and second fuel/air injector means (e.g., airblast injector means) include respective first and second fuel discharge means for receiving fuel from fuel supply means for discharge to the combustor during operation of the engine. The first and second fuel discharge means are in fuel flow communication to one another and to the combustor for discharging the fuel thereto. The first and second fuel/air injector means also include respective first and second air discharge means for receiving pressurized air from air supply means during operation of the engine. The first and second air discharge means are communicated to the combustor for discharging the pressurized air thereto.

The first and second fuel/air injector means are operative in response to discharge of the pressurized air to establish different pneumatic pressures (static air pressures) at the first and second fuel discharge means such that, in the event the supply of fuel to the first and second fuel discharge means is interrupted during operation of the engine, the fuel residing in the fuel injector means between the first and second fuel discharge means is subjected to a pressure differential effective to purge the resident fuel into the combustor for combustion therein. The resident fuel is purged through the first or second fuel discharge means having the least pneumatic pressure established thereat.

The first and second air discharge means typically include respective first and second air discharge lips and the first and second fuel discharge means typically include respective first and second fuel discharge lips. The relationship of the first air discharge lip and first fuel discharge lip is different from the relationship of the second air discharge lip and the second fuel discharge lip as means on the injectors for establishing the different pneumatic pressures at the first and second fuel discharge lips in response to discharge of the pressurized air when fuel supply to the injectors is interrupted. For example, the relative configuration/orientation of the first air/fuel discharge lips is different from that of the second air/fuel discharge lips to establish a selected pneumatic pressure at the first fuel discharge lip and a lesser pressure at the second fuel discharge lip to thereby establish the desired pressure differential for fuel purging.

In another embodiment of the invention, the first and second fuel/air injector means comprise so-called radial jet fuel injectors including respective first and second circumferentially spaced apart fuel discharge openings for discharging fuel to the combustor and in fuel flow communication via respective first and second fuel discharge passages. The first and second fuel injectors are cooperably associated with respective first and second air injector means (e.g., air discharge swirlers) for receiving pressurized air from air supply means during operation of the engine. The first and second air injector means are communicated to the combustor for discharging the pressurized air thereto.

The size of the fuel discharge openings of the first radial jet injector means is different from (e.g., larger than) the size of the fuel discharge openings of the second radial jet fuel injector to provide means on the fuel injector means cooperative with discharge of the pressurized air from the air injector means for establishing a different pneumatic pressure at the fuel discharge openings of the first fuel injector as compared to the fuel discharge openings of the second fuel injector means such that, in the event the supply of fuel is interrupted during operation of the engine, the fuel residing in the injectors is subjected to a pressure differential effective to purge the resident fuel into the combustor.

In another particular embodiment of the invention, the first and second radial jet fuel injectors include like-sized fuel discharge openings, and the first and second air injector means are differently configured to establish the needed pressure differential between the fuel discharge openings of the first and second radial jet fuel injectors to purge the resident fuel to the combustor in the event of an interruption in the supply of fuel to the fuel injectors during engine operation.

The first and second fuel/air injector means of the types described above may comprise secondary (or main) injectors of a staged fuel injector system of a gas turbine engine to supply fuel/air to the combustor during the high power (e.g., high speed) regime of engine operation while pilot fuel/air injectors provide fuel/air for low and high power regimes of engine operation. In this instance, the supply of fuel to the first and second fuel/air injectors would be intentionally interrupted during staging of fuel supply to the combustor. Resident fuel in the fuel injectors would be purged into the combustor by virtue of the pneumatic pressure differential applied to the resident fuel. Alternately, the first and second fuel/air injectors of the types described above may comprise pilot fuel/air injectors of a staged fuel injector system to supply fuel/air to the combustor during both low and high regimes of engine operation. In this instance, the supply of fuel to the fuel injectors may be unintentionally interrupted during engine operation. The fuel residing in the fuel injectors would be purged into the combustor in this situation in accordance with the invention.

In the context of staging fuel to the combustor of a gas turbine engine, a sufficient pressure differential is established on the resident fuel between the first and second fuel discharge means when the first and second fuel injector means are rendered non-operative during the lower power engine operation regime to purge the resident fuel into the combustor rapidly enough for ignition by an existing flame region created by the fuel/air discharged to the combustor. A fuel supply valve means is employed to render the first and second fuel injector means operative/non-operative during the high and lower power regimes of engine operation.

The first and second fuel/air injector means may be used in other instances in a fuel/air injector system where there is a need to purge fuel residing between the first and second fuel discharge means in the event of an intentional or unintentional interruption in the supply of fuel thereto.

The fuel/air injector system of the invention may include a plurality of fuel injector means wherein a selected pneumatic pressure is established at a fuel discharge lip of one of the fuel injector means and a lesser pressure is established at fuel discharge lips of other (e.g., two or more) fuel injectors to establish a sufficient pressure differential on the resident fuel in all of the fuel injectors to purge the resident fuel into the combustor for combustion in the event of an intentional or unintentional interruption in the supply of fuel thereto to the fuel injectors.

In an embodiment of the present invention, the first and second fuel discharge means of the fuel injector means include respective first and second fuel discharge passages communicated to one other in fuel flow relation via a conduit means and terminating in respective first and second fuel discharge lips communicated to the combustor. A fuel shut-off valve means may be disposed between the conduit means and the fuel supply means to isolate the conduit means from the fuel supply means in the event of fuel supply interruption to the injectors. In this embodiment of the invention, the pressure differential established on the fuel residing between the fuel discharge lips is sufficient to purge the resident fuel between the first and second fuel discharge passages and also in the isolated conduit means in the event fuel supply is interrupted.

The present invention further contemplates a method of fueling a combustor of a gas turbine engine wherein fuel is supplied to interconnected first and second fuel discharge means of respective first and second fuel injector means during operation of the engine for discharge to the combustor for sustaining a flame region in the combustor, and pressurized air is supplied to respective first and second air injector means cooperably associated with the first and second fuel injector means during the operation of the engine for discharge to the combustor for sustaining the flame region. Different pneumatic pressures are established at the first and second fuel discharge means during discharge of the pressurized air from the air injector means such that upon an interruption, intentional or unintentional, in fuel supply to the first and second fuel injector means during operation of the engine, the different pressures established at the first and second fuel discharge means subject the resident fuel to a pressure differential effective to purge the resident fuel into the combustor rapidly enough for the purged fuel to be ignited by the flame region.

In the context of fueling a combustor in stages, a sufficient pressure differential is established on the resident fuel between the interconnected first and second fuel discharge means when the first and second fuel injector means are rendered non-operative during the lower power engine operation regime such that the resident fuel is purged into the combustor rapidly enough for the purged fuel to be ignited in the combustor by the flame region.

The present invention also contemplates a radial jet fuel injector having a fuel injector body defining a fuel discharge passage communicated to a plurality of circumferential spaced fuel discharge openings disposed at a fuel discharge end of the injector. The fuel injector includes a tubular cap member disposed about the fuel injector body at at least the region thereof including the fuel discharge openings (i.e., about the injector discharge end) and defining an air flow passage between the cap member and fuel injector body for receiving pressurized air (e.g., compressor discharge air). The portion of the cap member overlying the fuel discharge openings includes a plurality of circumferentially spaced cap fuel discharge apertures each registered with a respective fuel discharge opening of the fuel injector body such that fuel is discharged first through the injector body fuel discharge openings and then through the cap fuel discharge apertures. The cap member protects the fuel injector body from damage during assembly of the radial jet fuel injectors in the combustor of the gas turbine engine.

The present invention may be better understood when considered in light of the following detailed description of certain specific embodiments thereof taken in conjunction with the following drawings.

DESCRIPTION OF THE DRAWINGS

FIG. 13 is a graph illustrating the relationship between the air flow velocity that would be attributable to pressure loss across the combustor and the pneumatic pressure (static air pressure) established at the fuel discharge lip of the designated fuel injectors.

FIG. 24 is a cross-sectional view of a "fuel-puller" radial jet fuel injector in accordance with another embodiment of the invention.

FIG. 25 is a partial sectional view of the capped end of a radial jet fuel injector in accordance with still another embodiment of the invention.

FIG. 26 is a graph illustrating the relationship between the air velocity ($\Delta P$) and the pressure differential generated between fuel discharge openings of "fuel-pusher" and "fuel-puller" radial jet fuel injectors.

DETAILED DESCRIPTION OF THE INVENTION

Figure 1:
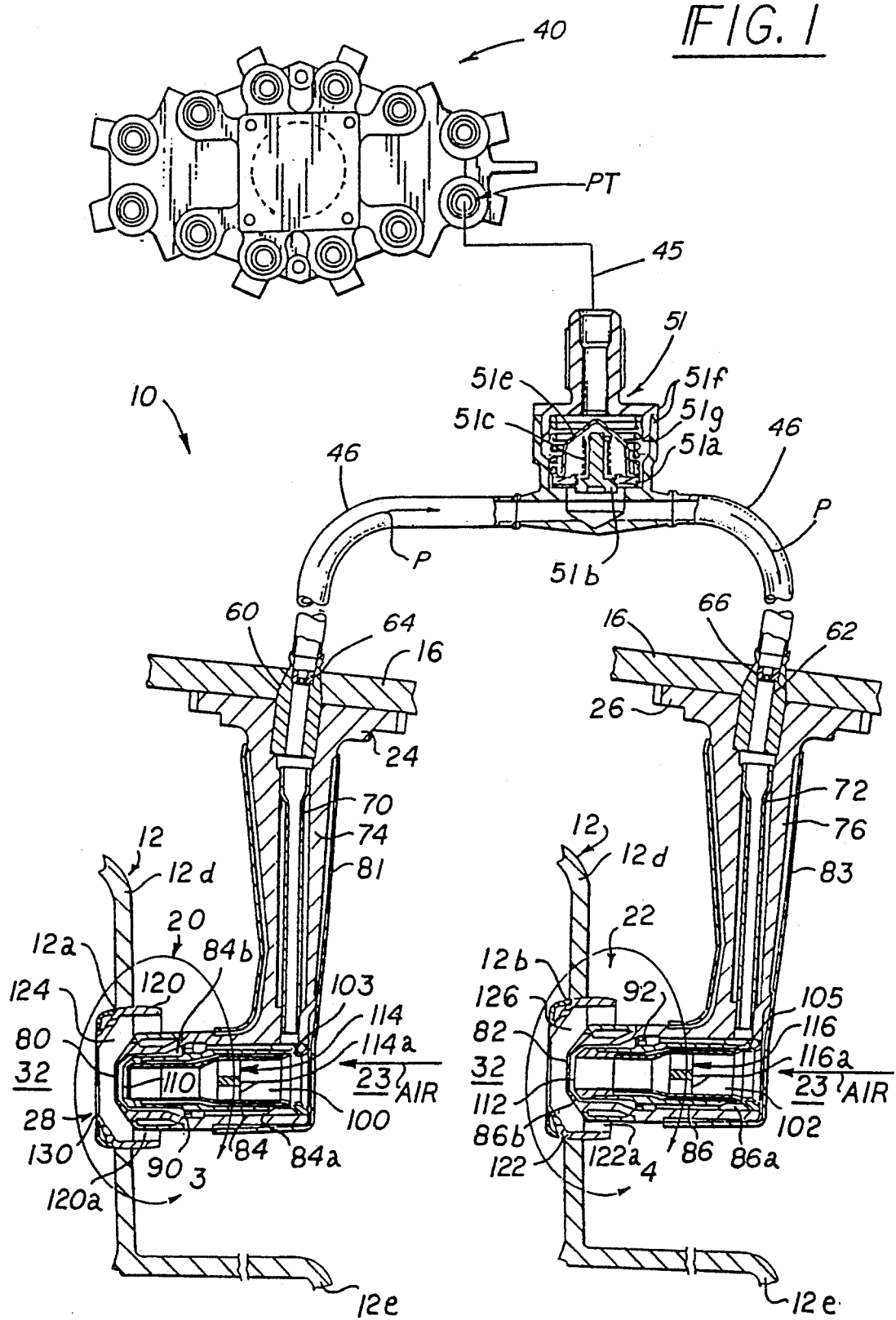
FIG. 1 is a partial side sectioned view of a staged gas turbine engine fuel system in accordance with one embodiment of the invention for supplying fuel to an annular engine combustor, which is partially shown via fuel-/air injectors (so-called airblast fuel injectors). Although the airblast fuel injectors are disposed in a common axial plane as shown in FIG. 2, they are shown axially displaced in FIG. 1 for convenience in illustrating the internal features of the injectors.
Figure 2:
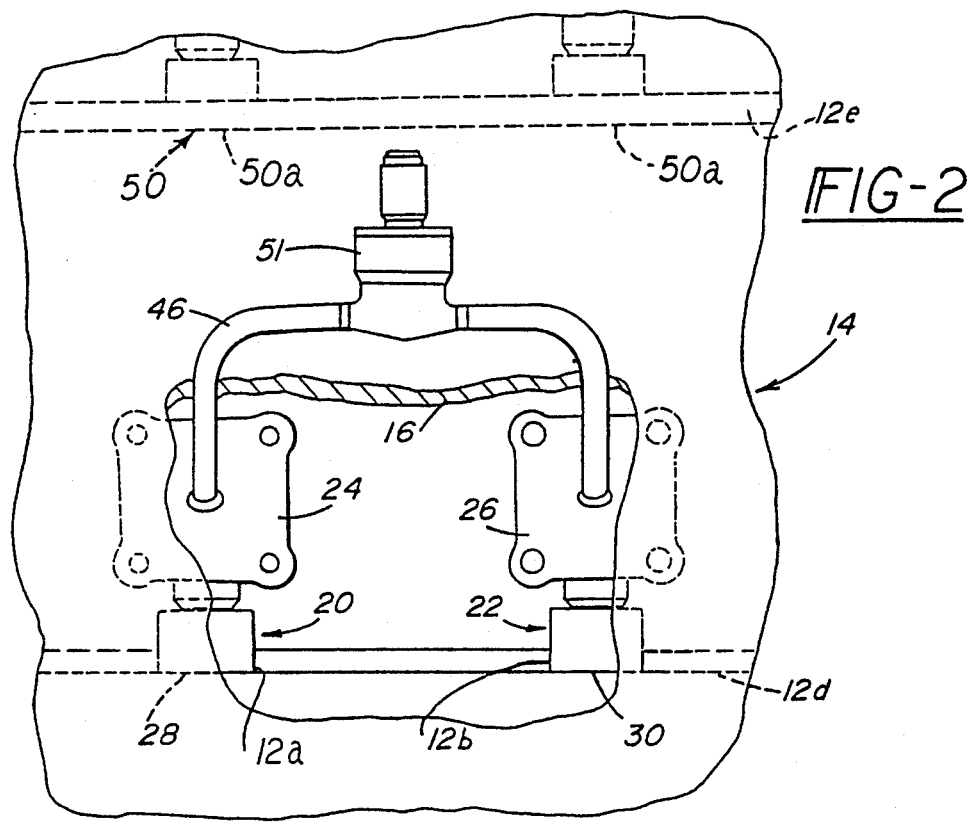
FIG. 2 is a partial top view of the embodiment of FIG. 1 with the engine duct broken away to reveal the airblast fuel injectors and combustor.

Referring to FIGS. 1-2, a fuel/air injector system 10 in accordance with one embodiment of the invention is illustrated operatively associated relative to an annular combustor 12 of a gas turbine engine 14. The combustor 12 is disposed inside an engine duct 16 for receiving pressurized (superambient pressure) discharge air from an air supply plenum 23 (air supply means) which communicates with the engine compressor (not shown) located upstream of the combustor 12 in conventional manner. The fuel/air injector system 10 is shown including a pair of first and second fuel/air injectors 20,22 having flanges 24,26 fastened to the duct 16 and having fuel/air discharge tips 28,30 received in openings 12a,12b of the combustor wall 12d so as to communicate with the combustion chamber 32 defined therein. The injectors 20,22 are located in a common axial plane about the combustor 12 as shown in FIG. 2. They are shown axially displaced in FIG. 1 so that the internal features of the injectors may be better shown.

Although only the single pair of injectors 20,22 is shown in FIGS. 1-2, it is to be understood that other like pairs of first and second fuel/air injectors 20,22 are mounted by like flanges 24,26 on the duct 16 in the same axial plane about the annular combustor 12 so that their fuel/air discharge tips 28,30 are received in corresponding circumferentially spaced openings in the combustor 12. Only the pair of injectors 20,22 is shown in FIGS. 1-2 for convenience, it being understood that other pairs of like fuel/air injectors are disposed about the combustor 12 in a common axial plane.

The fuel/air injectors 20,22 are shown for use as secondary (or main) injectors for staging fuel supply to the combustor 12 as called for during high power (e.g., high speed) regimes of engine operation. To this end, a fuel distribution valve 40 (fuel supply valve) is shown having a fuel supply port PT connected by a fuel conduit 45 (shown schematically) to the injectors 20,22 to control fuel flow thereto. Other fuel supply ports of the fuel distribution valve 40 are likewise connected to other pairs of like fuel injectors disposed about the combustor 12 as described above. The fuel distribution valve 40 is connected to a source (not shown) of fuel and meters fuel to each pair of fuel/air injectors 20,22 via conduit 45 and a fuel shut-off valve 51 disposed between the conduit 45 and downstream fuel conduits 46. The fuel shut-off valve 51 preferably comprises an on/off check valve having a valve seat 51a and valve 51b that is biased by spring 51c to close when fuel pressure in the conduit 45 upstream of the valve is less than a selected value; e.g., when a 40 psi differential is present across the valve. The valve 51b is closed and seals against the seat 51a when the fuel pressure upstream of the valve drops below the selected value. The valve 51b may have a "soft" seat formed by a resilient (plastic) insert or a "hard" seat of suitably hard material, such as heat treatable stainless steel, to cooperate with valve seat 51a to effect sealing. A fuel filter element 51e is provided to remove dirt, debris, etc. from fuel flowing through the valve 51. Spring 51g holds the valve seat 51a and filter element 51e in position relative to the housing 51f. The ends of fuel conduits 45,46 are connected to the valve housing 51f by welding, brazing or other fastening techniques. The fuel shut-off valve 51 may be omitted in practicing the invention.

The fuel distribution valve 40 may be a distribution valve of the type used o the V2500 gas turbine engine sold by the Pratt & Whitney Aircraft Division of United Technologies Corporation. The distribution valve is made by the Hamilton Standard Division of United Technologies Corporation. The fuel distribution valve 40 may also comprise a distribution valve of the type described in U.S. Pat. Nos. 4,614,202 and 4,590,768, the teachings of which are incorporated herein by reference.

The injectors 20,22 are shown for use in conjunction with pilot fuel injectors 50 (only two shown in FIG. 2). Although only two pilot fuel injectors are shown, it should be understood that other like pilot injectors are circumferentially disposed about the combustor 12 in a common axial plane upstream of the secondary fuel injectors 20,22. The pilot fuel injectors 50 may be mounted on the duct 16 in a similar manner described above for mounting the fuel injectors 20,22 so that the discharge tips 50a of the pilot injectors are received in circumferentially spaced openings in an upstream combustor wall 12e. The pilot fuel injectors 50 are appropriately disposed, such as at a different elevation or level, on the combustor 12 so that they receive pressurized discharge air from a plenum communicated to the engine compressor (not shown). The pilot fuel injectors 50 may comprise airblast fuel injectors of the type described in Helmrich U.S. Pat. No. 3,864,186. The pilot fuel injectors 50 provide atomized primary fuel flow to the combustor 12 during all regimes of engine operation as is known. The pilot fuel injectors 50 are typically supplied with fuel via a fuel distribution valve like valve 40 described hereinabove via suitable fuel conduits.

The first and second fuel/air injectors 20,22 are shown as comprising airblast fuel injectors wherein the pressurized discharge air (see arrows) is received from the air supply plenum 23 communicating with the engine compressor (not shown) and discharged to atomize the fuel discharging from the injector into the combustor 12 and to support combustion of the discharged fuel as a supplemental flame region in the combustor 12. The first and second injectors 20,22 are similar in construction with the important exception that one injector (e.g., the first injector 20) is constructed to function as a so-called "fuel-pusher" injector (i.e., having a higher static air pressure established at the fuel discharge lip) and the other injector (e.g., the second injector 22) is constructed as a so-called "fuel-puller" injector (i.e., having a lesser static air pressure established at the fuel discharge lip) in response to air discharged therefrom in order to establish a pneumatic pressure differential on the fuel residing between the respective first and second fuel discharge lips 80,82 (fuel discharge means) of sufficient magnitude in order to purge fuel in the respective injectors 20,22 as well as in fuel conduits 46 to the combustor 12 when the injectors 20,22 are rendered non-operative during the lower power regime of engine operation (e.g., during engine idle operation) or when the supply of fuel thereto is otherwise interrupted. These aspects of the fuel injectors 20,22 will be described further hereinbelow.

The first and second fuel/air injectors 20,22 comprise respective inlet fittings 60,62 to which the ends of the fuel conduits 46 are welded, brazed or otherwise fastened for supplying fuel to the injectors. Each fitting includes a trim orifice 64,66 which are used in conventional manner to provide generally the same fuel flow rate to each of the injectors 20,22. The fuel supplied to the injectors 20,22 flows through respective fuel inlet pipes 70,72 disposed in the injector housings 74,76 as shown to provide an insulating air space about each inlet pipe 70,72. A thermal shield 81,83 is disposed about each injector housing 74,76 to this same end.

The fuel flows from the inlet pipes 70,72 through respective annular fuel discharge passages 84,86 in the respective injector housings 74,76 for discharge from the respective downstream annular fuel discharge lips 80,82 communicated to the combustor 12. Each fuel discharge passage 84,86 includes an upstream and downstream portion 84a,84b and 86a,86b and a plurality of fuel swirl passages 90,92 circumferentially spaced apart between the upstream and downstream portions of each fuel discharge passage 84,86 to impart swirl to the fuel as it flows through each fuel discharge passage.

The first and second injectors 20,22 include respective central, inner air discharge passages 100,102 integral with each injector for receiving compressor discharge air and discharging the air from respective downstream, annular inner air discharge lips 110,112 (air discharge means) communicated to the combustor 12. Similar air swirl members 114,116 are disposed in the respective air passages 100,102. Each air swirl member includes a plurality of circumferentially spaced swirl vanes 114a,116a for imparting swirl to the air flowing through the passages 100,102 before discharge from the inner air discharge lips 110,112. Tubular members 103,105 are disposed in passages 100,102 to define air spaces thereabout.

The first and second injectors 20,22 also may include respective outer air shrouds 120,122 attached thereto and defining outer air passages 124,126 for receiving compressor discharge air and discharging the air from respective downstream, annular outer air discharge lips 130,132 communicated to the combustor 12. Each outer air shroud includes a plurality of circumferentially spaced swirl vanes 120a,122a for imparting swirl to the air flowing therethrough before discharge from the outer air discharge lips 130,132. Each outer shroud 120,122 includes an auxiliary air discharge lip 134,136 (FIG. 3 and 4) for discharging cooling air across the downstream end of the air shrouds. The cooling air is flowed through a plurality of circumferentially spaced, axially extending air apertures 135, 137. The air shrouds 120,122 may be fastened on the combustor wall 12d in lieu of the injectors 20,22.

As mentioned hereinabove, the first injector 20 is constructed to function as a so-called fuel-pusher injector and the second injector 22 is constructed as a so-called fuel-puller injector in response to air discharged therefrom in order to establish a pneumatic pressure differential (static air pressure differential) on the fuel residing in the injectors between the respective first and second fuel discharge lips 80,82 (fuel discharge means) of sufficient magnitude to purge the resident fuel (i.e., fuel residing in the fuel discharge passages 84,86 and other passages of the fuel injectors as well as in the fuel conduits 46) when the injectors 20,22 are rendered non-operative during the lower power regime of engine operation (e.g., during engine idle operation) or when the supply of fuel thereto is otherwise interrupted.

Figure 3:
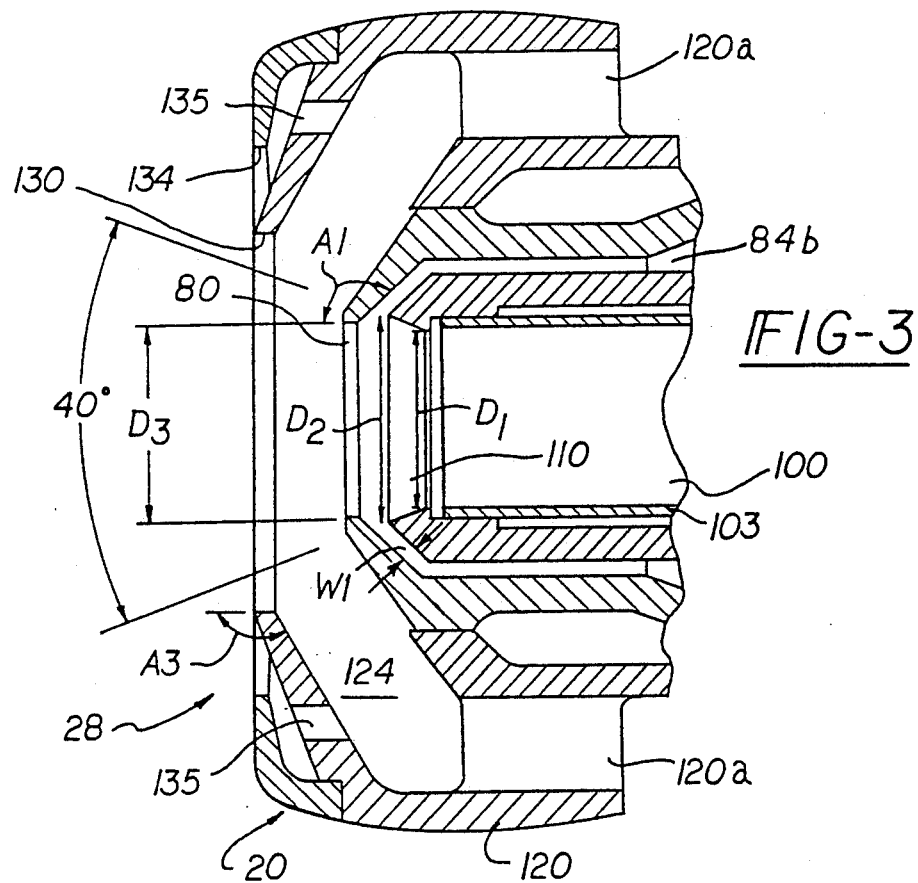
FIG. 3 is an enlarged sectional view of the "fuel-pusher" airblast fuel injector of FIG. 1.
Figure 4:
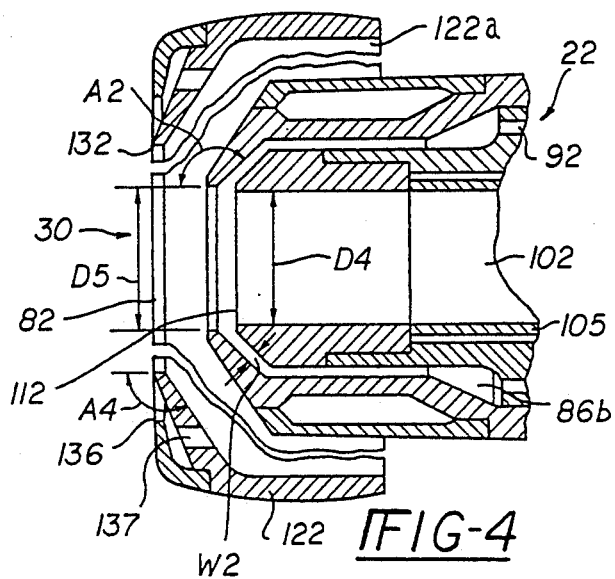
FIG. 4 is an enlarged sectional view of the "fuel-puller" airblast fuel injector of FIG. 1.
Figure 5:
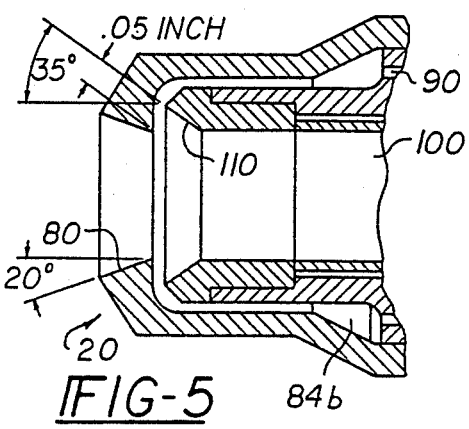
FIGS. 5 and 7-12 are sectional views of alternative "fuel-pusher" airblast fuel injectors usable in practicing the invention. The outer air shroud of these injectors is omitted in each Figure.
Figures 10, 11:
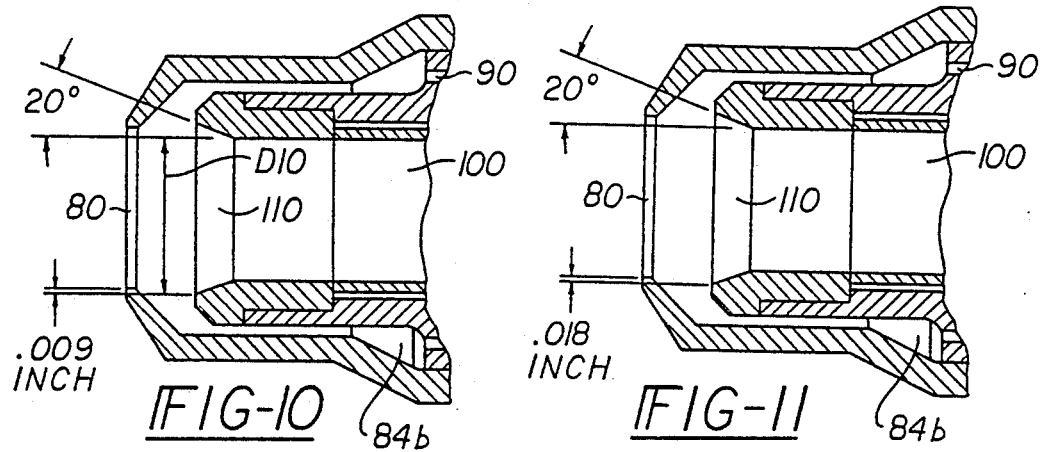
Figure 12:
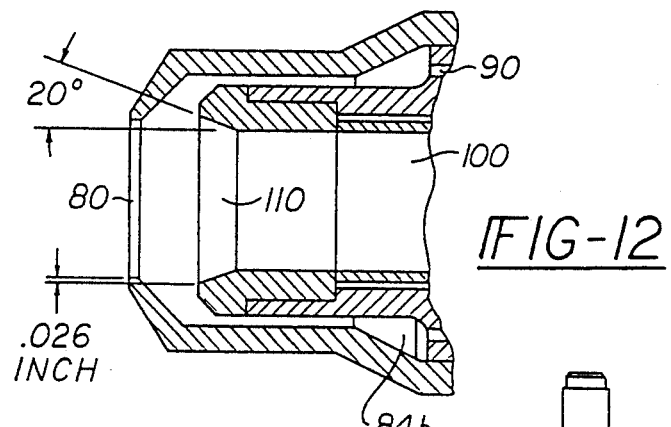

Referring to FIGS. 3–4, the first and second injectors 20,22 are shown including the respective inner air discharge lips 110,112 which differ in configuration in order to establish the desired pressure differential at the fuel discharge lips 80,82 as shown in FIG. 13 for the inner and outer air velocities provided in the inner air passages 100,102 and air shrouds 120,122 (e.g., as a result from the pressure drop across the combustor). The air velocity values are set forth on the abscissa while the resulting static air pressure values at the fuel discharge lips 80 are set forth on the ordinate of FIG. 13. It is apparent from FIG. 13 that the measured air pressure (line labelled FIG. 3 and 10) at the fuel discharge lip 80 of the fuel-pusher injector 20 is positive (above 0 inches of water) in the range of the air velocity values used while the measured air pressure (line labelled FIG. 4) at the fuel discharge lip 82 of the fuel-puller injector 22 is negative (below 0 inches of water). The pneumatic pressures were measured at sea level pressure using a U-tube water manometer with no fuel flowing through the fuel passages/lips of the injectors.

The geometric configuration of the air/fuel discharge passages/swirlers and air/fuel discharge lips were the same for injectors 20,22 with the exception that the inner air discharge lip 110 of the fuel-pusher injector 20 was machined to diverge toward the combustor 12 at a nominal 20° acute angle relative to the longitudinal center axis of the injector 20 to provide an inner air discharge lip diameter slightly larger than the diameter of the fuel discharge lip 80. For example, the smaller diameter D1 of the inner air discharge lip 110 was nominally 0.280 inch diverging to a larger diameter D2 of nominally 0.320 inch. The inner diameter D3 of the fuel discharge lip 80 was nominally 0.300 inch. Therefore, diameter D2 of air discharge lip 110 was greater than diameter D3 of fuel discharge lip 80 of fuel-pusher injector 20.

The inner diameter D4 of the inner air discharge lip 112 of fuel-puller injector 22 was nominally 0.280 inch, while the inner diameter D5 of the fuel discharge lip 82 thereof was nominally 0.300 inch. Diameter D4 of air discharge lip 112 was thus smaller than diameter D5 of fuel discharge lip 82 of fuel-puller injector 22.

The widths W1,W2 of the fuel discharge passages (FIGS. 3–4) were the same; e.g., 0.020 inch, as were their fuel lip convergence angles A1 and A2; e.g., 135°. The axial widths of the fuel discharge lips 80,82 were the same (0.020 inch). Further, the outer air shrouds 120,122 were the same for the fuel-pusher and fuel-puller injectors 20,22; e.g., the inner diameters of lips 130,132 were nominally 0.590 inch. The angles A3,A4 of air lip convergence were nominally 120° for both shrouds. The axial space between the fuel discharge lips 80,82 and the inner air discharge lips 110,112 and between lips 80,82 and the outer air discharge lips 130,132 were also the same for injector 20,22; e.g., nominally 0.028 and 0.138 inch, respectively, for both injectors 20,22.

The pneumatic pressure differential established at the fuel discharge lips 80,82 by cooperation of the fuel/air injectors 20,22 has been found to be sufficient to cause injector 20 to function as a fuel-pusher injector and to cause injector 22 to function as a fuel-puller injector when fuel flow is interrupted to the injectors 20,22 in the range of air flow velocities used, whereby the fuel in the injectors and in the conduits 46 is subjected to a differential pneumatic pressure that is effective to purge the fuel in the direction of arrow P in FIG. 1 into the combustor 12 through the fuel discharge lip which has the lesser static pressure thereat. Moreover, the purging of fuel in the fuel discharge passages 80,82 and in the conduits 46 occurs rapidly enough (e.g., about 3 seconds) after fuel flow is shut off by the shut-off valve 51 (in response to reduced fuel flow by the distribution valve 40) to cause the purged fuel to be ignited and combusted by the combustion flame region sustained by the fuel previously discharged from the injectors 20,22 prior to the valve 51 being closed. The time required for complete purging of the resident fuel may be varied by controlling the magnitude of the pressure differential established on the resident fuel.

As a result, the gas turbine engine can be operated in a staged manner wherein the fuel injectors 20,22 are supplied fuel by the distribution valve 40 and open shut-off valve 51 as required during a high power regime of engine operation to render the injectors operative to sustain a supplemental combustion flame region in the combustor 12 for increased power. When the engine is to be operated at a lower power regime (e.g., idle or high altitude descent), the distribution valve fuel 40 will be actuated to reduce fuel flow to the injectors 20,22 to an extent that causes the shut-off valve 51 to close and render the injectors 20,22 subsequently non-operative to supply supplemental fuel to the combustor 12. When the injectors 20,22 are rendered non-operative to provide staged fuel flow, the pneumatic pressure differential is established on the fuel residing in the injectors 20,22 and conduits 46 (between the fuel discharge lips 80,82) effective to purge the resident fuel in the fuel passages 84,86 and the isolated conduits 46 into the combustor 12 rapidly enough to ignite the purged fuel by the preexisting flame region of the injectors 20,22 for combustion in the combustor. Emissions from the engine otherwise attributable to dumping of raw fuel into the combustor when the injectors 20,22 are rendered non-operative are substantially reduced. Moreover, coking of fuel that would otherwise reside in the fuel discharge passages 84,86 is substantially avoided.

Although the invention has been described hereinabove with respect to certain fuel injector constructions to render injector 20 a fuel-pusher injector and injector 22 a fuel-puller injector, the invention is not so limited. For example, FIGS. 5 and 7–12 (wherein like features are represented by like reference numerals) illustrate alternative pusher airblast fuel injector constructions usable in practicing the invention wherein the outer air shroud is omitted for convenience. In general, the fuel-pusher injectors have an inner air discharge lip 110 having a greater diameter than an axially proximate diameter of the fuel discharge lip 80, all other features of the discharge tips 28,30 being the same. The fuel-pusher injectors shown in FIGS. 5 and 7–12 would include an outer air shroud like that shown in FIGS. 3–4. The pneumatic pressure at the fuel discharge lip of these fuel-pusher injectors is shown in FIG. 13 as determined under the same test conditions. Three variations of the fuel-pusher injector of FIG. 10 were also tested to determine the effect of increasing the diameter D10 of the fuel discharge lip 80 by 0.0015 inch, 0.005 inch, and 0.0065 inch as designated on FIG. 13. The increase in diameter D10 is seen to reduce the static air pressure measured at the fuel discharge lip 80. Thus, variation of the diameter of fuel lip 80 (relative to air lip 110) from one injector to the other may be used to establish the desired pressure differential to achieve self-sustaining purging of fuel from injectors.

In general, the relationship of the first air discharge lip 110 and first fuel discharge lip 80 is different from the relationship of the second air discharge lip 112 and the second fuel discharge lip 82 so as to provide means on the injectors cooperable with the discharged presurized air to establish the required different pneumatic pressures (static air pressures) at the first and second fuel discharge lips. In particular, the relative configuration/orientation of the first fuel/air discharge lips 80,110 can be made different from the relative configuration/orientation of the second fuel/air discharge lips 82,112 to establish a selected pneumatic pressure at the first fuel discharge lip and a lesser pressure at the second fuel discharge lip to thereby establish the desired pressure differential for fuel purging. For example, in FIG. 3, the fuel and air discharge lips 80,110 have the air lip 110 diverging relative to the fuel lip 80 to provide a greater air lip diameter D2 than the fuel lip diameter D3, whereas the fuel and air lips 82,112 do not have such a relationship, all other features of the discharge tips 28,30 being the same. The different pressures can be established by using fuel-pusher/less pusher injectors; fuel-pusher/puller injectors; or fuel-puller/less puller injectors having their fuel discharge passages in fuel flow communication. The magnitude of the pressure differential established between the fuel discharge lips generally depends on the geometric configuration of the fuel air/fuel discharge lips, air flow dynamics in, the immediate vicinity of the air/fuel discharge lips and the plenum (supply) air pressure level. Moreover, the air pressure or density level supplied to the first and second injectors as well as the pressure drops across the first and second fuel injector discharge tips 28,30 may be used to establish a pressure differential on the resident fuel to purge it to the combustor.

Figure 6:
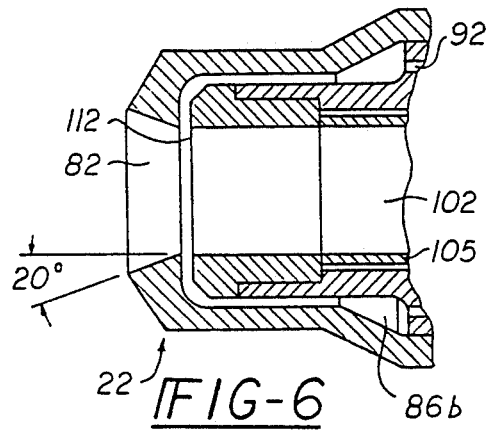
FIG. 6 is a sectional view of an alternative "fuel-puller" airblast fuel injector usable in practicing the invention. The outer air shroud is omitted from the injector in FIG. 6.
Figure 7:
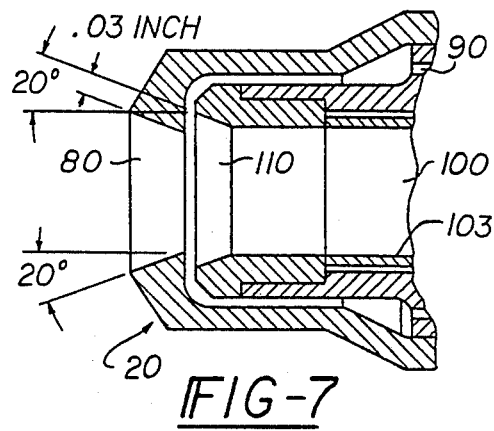

FIG. 6 illustrates an alternative fuel-puller airblast fuel injector usable in practicing the invention where, again for the sake of convenience the outer air shroud is omitted. The pneumatic pressure established at the fuel discharge lip thereof is shown (line labeled FIG. 6) in FIG. 13 as determined under the same test conditions.

Figure 8:
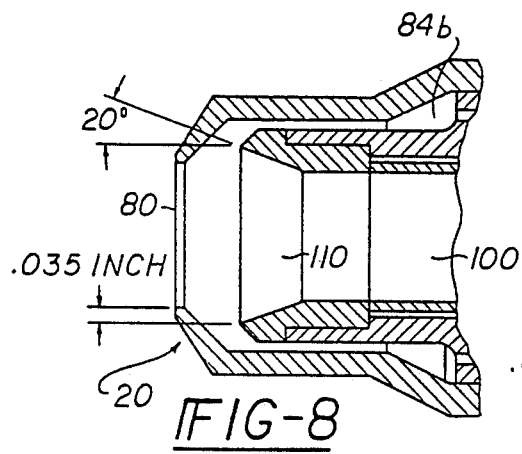
Figure 9:
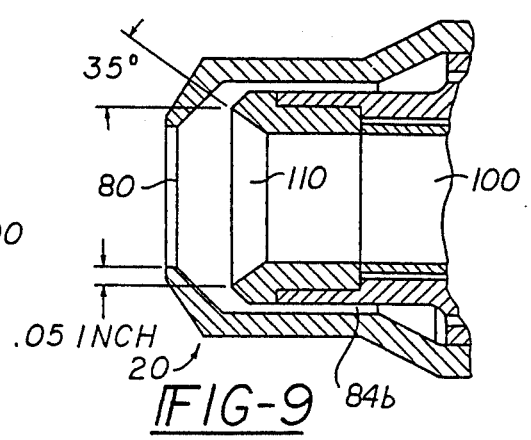
Figure 14:
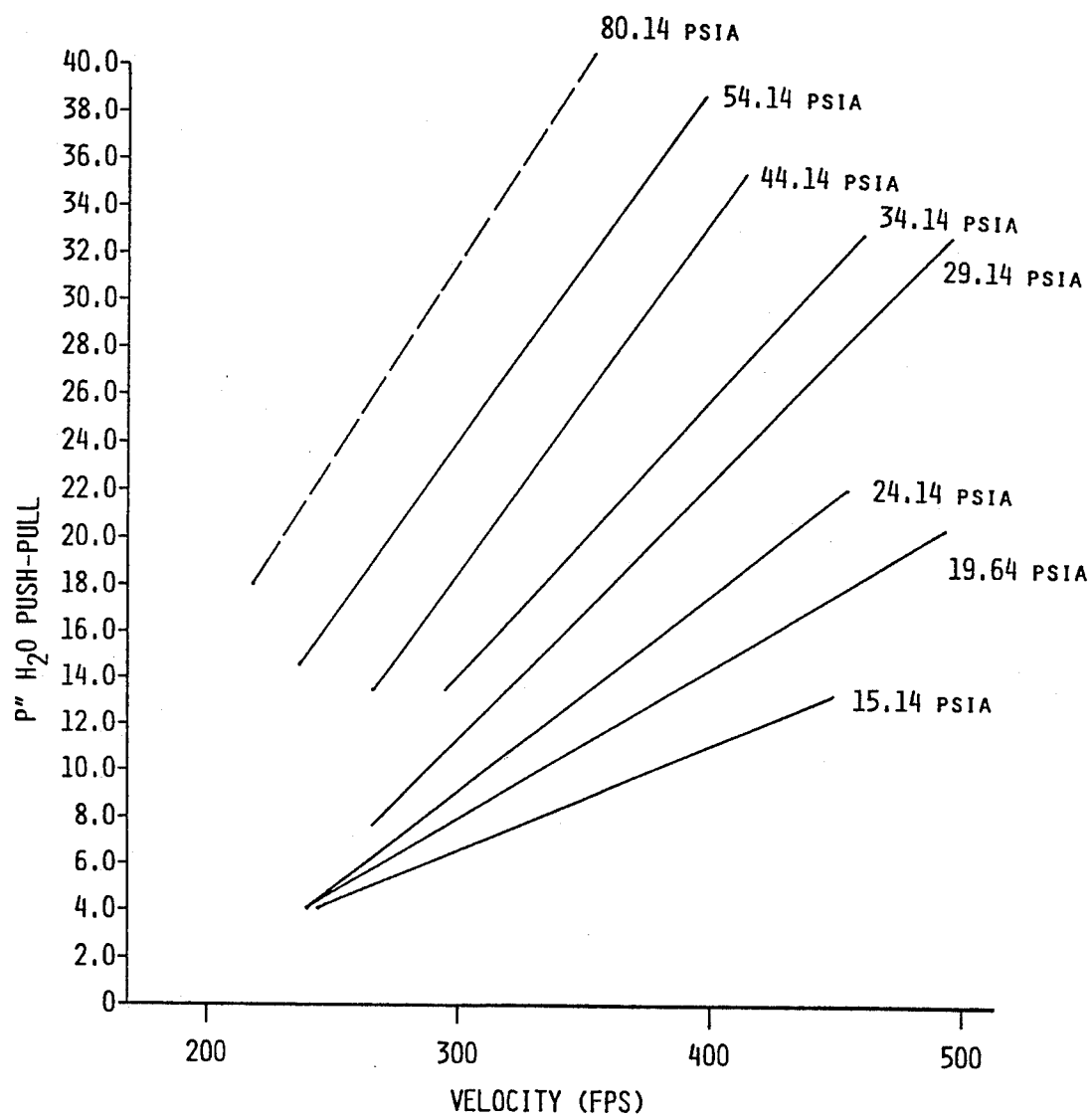
FIG. 14 is a graph illustrating the relationship between the air flow velocity at various plenum air pressures (corresponding generally to compressor discharge air density) and the pressure differential generated between the fuel discharge lips of the "fuel-pusher" and "fuel-puller" injectors of FIGS. 8 and 4, respectively.
Figure 15:
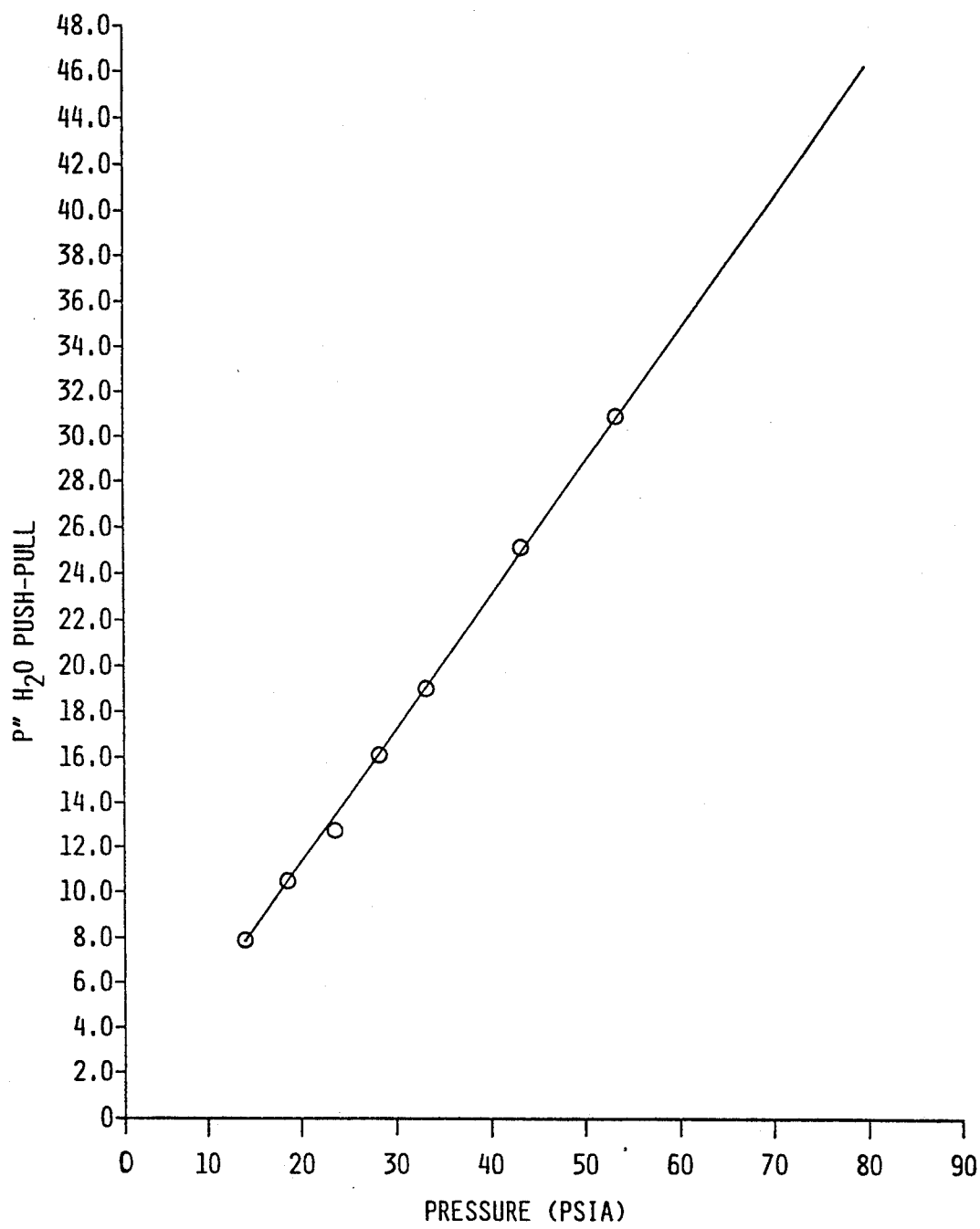
FIG. 15 is a graph illustrating the relationship between the air density (pressure) and the pressure differential generated between the fuel discharge lips for the "fuel-pusher" and "fuel-puller" injectors of FIG. 14 obtained by taking pressure differential values from FIG. 14 at a constant air velocity of 344 feet per second.

FIG. 14 illustrates for the fuel-pusher and fuel-puller injectors 20,22 shown in FIGS. 8 and 4, respectively, the relationship between air flow velocity at various air plenum pressures (corresponding to compressor discharge air density) and the pneumatic pressure differential generated between their fuel discharge lips 80,82. It is apparent that the pressure differential increases with increasing air density (pressure) for the range of air velocities set forth. First and second injectors supplied with different air pressures may thus establish the desired purging pressure differential between the fuel discharge lips. FIG. 15 illustrates for these same injectors the relationship between the air density (pressure) and the pressure differential generated between their fuel discharge lips 80,82. The data points of FIG. 15 were obtained by taking pressure differential values from FIG. 14 at a constant air velocity of 344 feet per second. It is apparent that the pressure differential increases with increasing air density at the constant air velocity of 344 feet per second.

Figure 16:
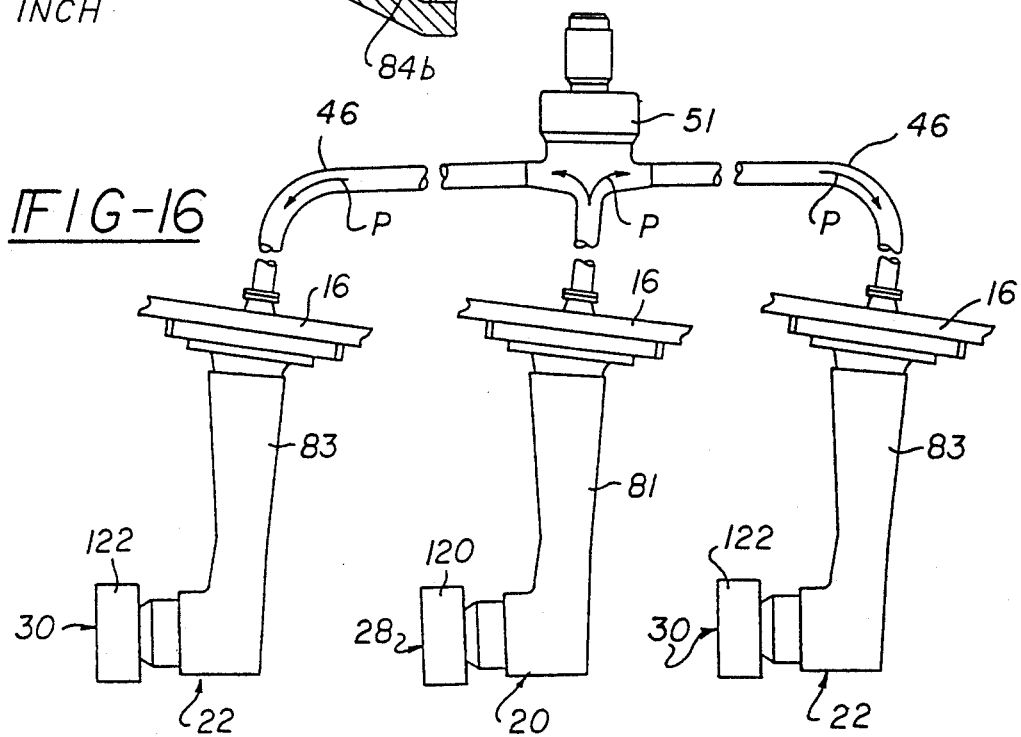
FIG. 16 is side view illustrating a fuel system in accordance with another embodiment of the invention wherein one "fuel-pusher" fuel injector is coupled in fuel flow relation to two "fuel-puller" fuel injectors.

FIG. 16 illustrates another embodiment of the invention where like reference numerals are used to represent like features of FIGS. 1–2. The embodiment of FIG. 16 differs from that of FIGS. 1–2 in having one fuel-pusher injector 20 coupled in fuel flow relation to two (or more) fuel-puller injectors 22 (which may be of the same or different construction) so as to purge fuel residing between the discharge lip 80 of the fuel-pusher injector 20 and the discharge lips 82 of the fuel-puller injectors 22 by virtue of the pressure differential established on the fuel residing therein as described above. The fuel residing in conduits 46 is also purged as a result of the pneumatic pressure differential established. The direction of fuel purging is represented by arrows P.

The present invention has been described hereinabove with respect to the first and second fuel injectors comprising secondary (or main) fuel injectors of a staged fuel injector system of a gas turbine engine to supply fuel to the combustor during the high power (e.g., high speed) regime of engine operation while pilot fuel injectors provide fuel for both the lower power regime (e.g., lower idle speed) and high power engine operation. However, the invention is not so limited. For example, the pilot fuel injectors 50 referred to above may be similar to the interconnected fuel injectors 20,22 so that resident fuel is purged from the pilot fuel injectors to the combustor 12 in the event of an unintentional interruption in supply of the pilot fuel thereto during operation of the engine by virtue of establishment of the aforementioned fuel pressure differential between the fuel discharge lips of the injectors 20,22.

In general, the interconnected fuel injectors 20,22 may be used in other instances in a fuel injector system where there is a need to purge fuel from the fuel discharge means in the event of an intentional or unintentional interruption in the supply of fuel to the injectors.

Figure 17:
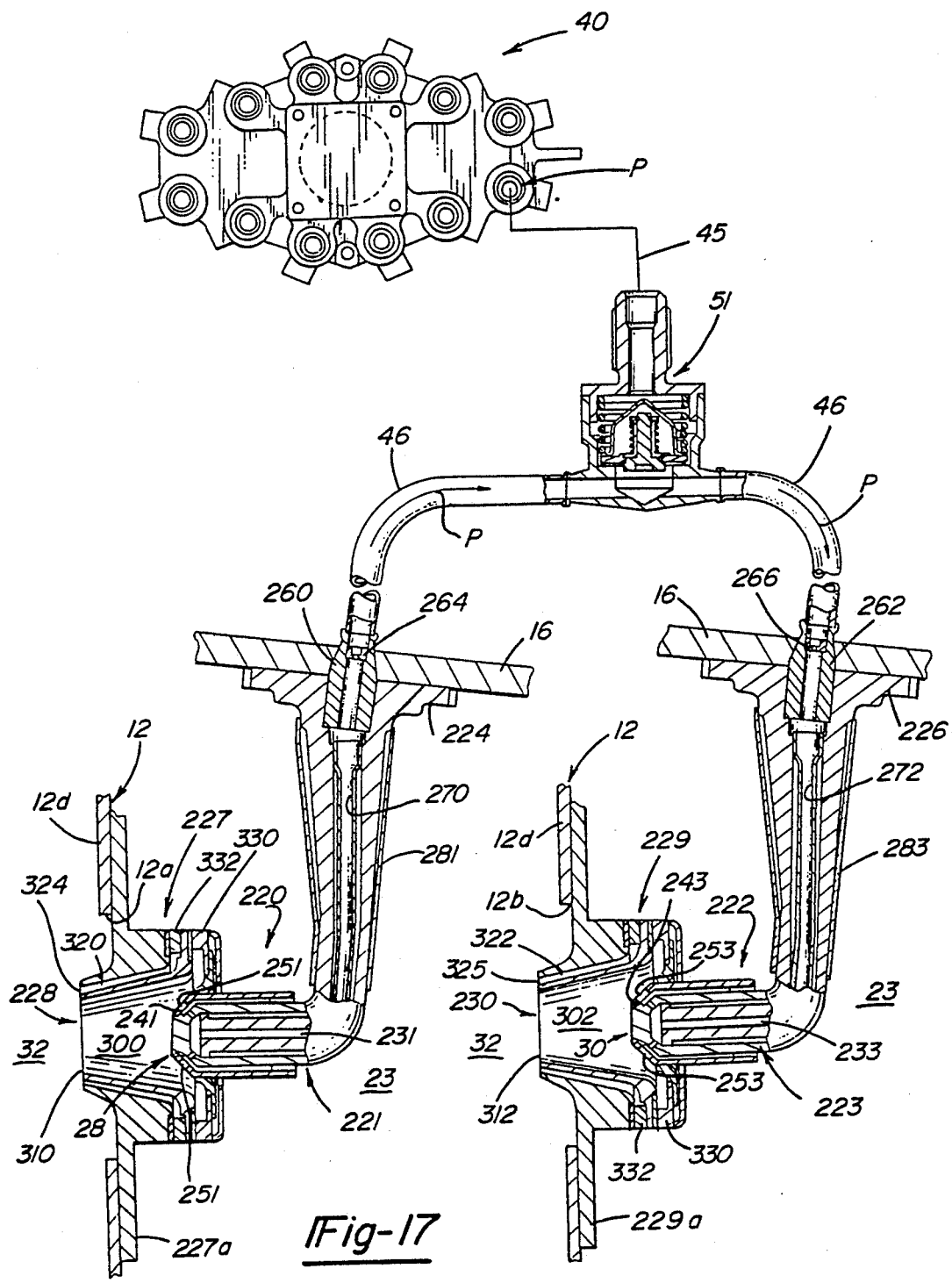
FIG. 17 is a view similar to FIG. 1 wherein radial jet fuel injectors and cooperably associated air injectors (air discharge swirlers) are substituted for the airblast fuel injectors of FIG. 1.
Figure 18:
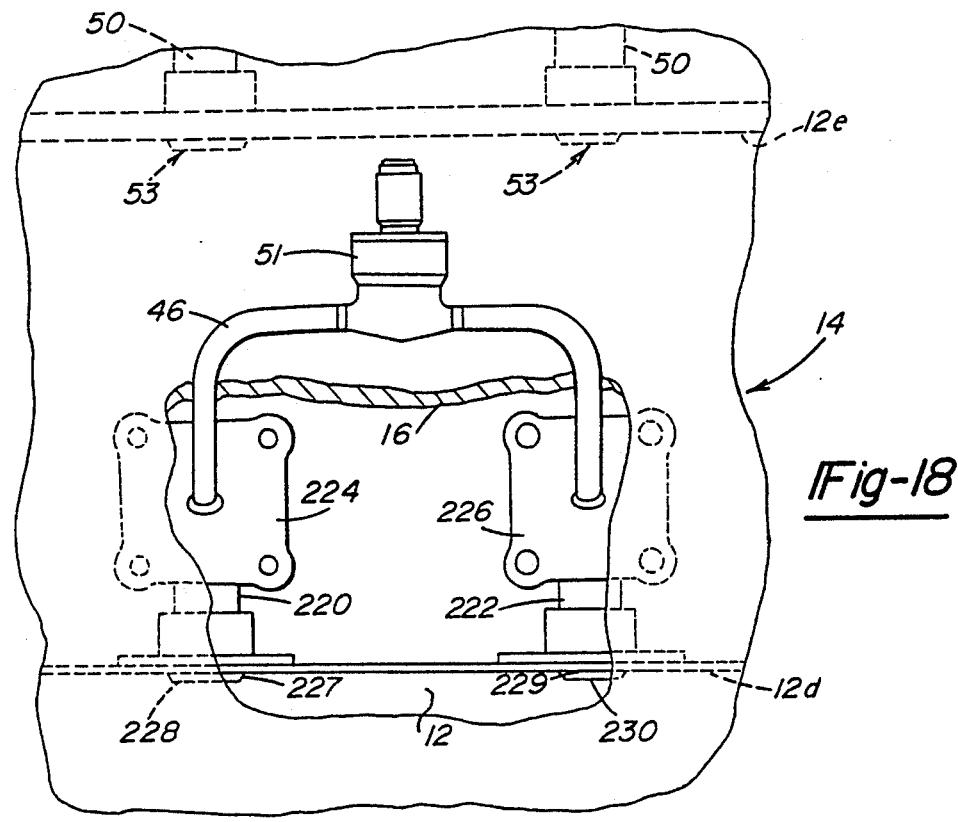
FIG. 18 is a partial top view of the embodiment of FIG. 17 with engine duct broken away to reveal the radial jet fuel injectors and associated air discharge swirlers.

Referring to FIGS. 17–18, a fuel/air injector system in accordance with another embodiment of the invention is illustrated operatively associated with the annular combustor 12 of the gas turbine 14 previously described with respect to FIGS. 1-2. In FIGS. 17-18, like features of FIGS. 1-2 are represented by like reference numerals.

The fuel/air injector system is shown including a pair of first and second fuel injectors 220,222 having flanges 224,226 fastened to the duct 16 and having fuel discharge tips 28,30 and including respective first and second air discharge swirlers (air injectors) 227,229 of like construction having air discharge tips 228,230. The swirlers 227,229 are received in openings 12a,12b of the combustor wall 12d so as to communicate with the combustion chamber 32 defined therein. The swirlers 227,229 include flanges 227a,229a fastened to the combustor wall 12d (not the injectors 220,222) by conventional fastening means.

The fuel injectors 220,222 are located in a common axial plane about the combustor 12 as shown in FIG. 18. They are shown axially displaced in FIG. 17 so that the internal features of the fuel injectors may be better shown.

Although only the single pair of fuel injectors 220,222 and air swirlers 227,229 (air injectors) is shown in FIGS. 17-18, it is to be understood that other like pairs of first and second fuel injectors 220,222 and air swirlers (air injectors) 227,229 are mounted on the duct 16 in the same axial plane about the annular combustor 12 so that their fuel/air discharge tips 28,30/228,230 are circumferentially spaced and communicate with the combustor 12.

The fuel injectors 220,222 are shown for use as secondary (or main) injectors for staging fuel supply to the combustor 12 as called for during high power (e.g., high speed) regimes of engine operation. To this end, the fuel distribution valve 40 (fuel supply valve) is shown having a fuel supply port PT connected by a fuel conduit 45 (shown schematically) to the fuel injectors 220,222 to control fuel flow thereto. Other fuel supply ports of the fuel distribution valve 40 are likewise connected to other pairs of like fuel injectors disposed about the combustor 12 as described above. The fuel distribution valve 40 is connected to a source (not shown) of fuel and meters fuel to each pair of fuel injectors 220,222 via conduit 45 and a fuel shut-off valve 51 disposed between the conduit 45 and downstream fuel conduits 46. The fuel distribution valve 40 may be a distribution valve of the type described above with respect to FIGS. 1-2.

The fuel injectors 220,222 are shown for use in conjunction with pilot fuel injectors 50 and air discharge swirlers (air injectors) 53 (only two of each shown in FIG. 18). Although only two pilot fuel injectors and air discharge swirlers are shown, it should be understood that other like pilot injectors are circumferentially disposed about the combustor 12 in a common axial plane upstream of the secondary fuel injectors 220,222. The pilot fuel injectors 50 are received in the swirlers 53 which are mounted on the upstream combustor wall 12e in a similar manner described above for mounting swirlers 227,229 on downstream combustor wall 12d so that their respective fuel and air discharge tips are circumferentially spaced and communicate to the combustor 12. The pilot fuel injectors 50 and air swirlers 53 are appropriately disposed, such as at a different elevation or level, on the combustor 12 so that the swirlers 53 receive pressurized discharge air from a plenum communicated to the engine compressor (not shown). The pilot fuel injectors 50 and air swirlers 53 may comprise radial jet fuel injectors and high shear swirlers of the type in use on F100-PW229 gas turbine engine made by United Technologies Pratt & Whitney Aircraft Division. The pilot fuel injectors 50 and air swirlers 53 provide atomized primary fuel flow to the combustor 12 during all regimes of engine operation as is known. The pilot fuel injectors 50 are typically supplied with fuel via a fuel distribution valve like valve 40 described hereinabove via suitable fuel conduits.

The first and second fuel injectors 220,222 are shown as comprising radial jet fuel injectors having an injector body 221,223 defining a central fuel discharge passage 231,233 communicated to a plurality of circumferentially spaced fuel discharge openings 235,237 located on a frusto-conical discharge tips 28,30. Each injector body 221,223 includes an inner body 221b,223b and outer tubular body 221c,223c fastened together at a weld or braze joint J.

Each fuel injector includes an outer tubular cap member 241,243 disposed about the respective fuel discharge tips 28,30 thereof in spaced relation to define an annular air passage 245,247 for receiving pressurized (compressor discharge) air from plenum 23. The frusto-conical portion of the cap member 241,243 includes a plurality of fuel discharge openings 251,253 that are registered with the respective fuel discharge openings 235,237 so that fuel discharged from each opening 235,237 also discharges through the associated registered opening 251,253. The cap member 241,243 is fastened to the injector body 221,223 by brazing and/or welding.

The tubular cap members 241,243 protect the fuel discharge ends 28,30 of the fuel injectors from possible damage during installation or assembly in the combustor 12.

The compressor discharge air flowing through outer passages 245,247 facilitates atomization of the fuel discharged from fuel discharge openings 251,253 of the cap members 241,243.

Figure 19:
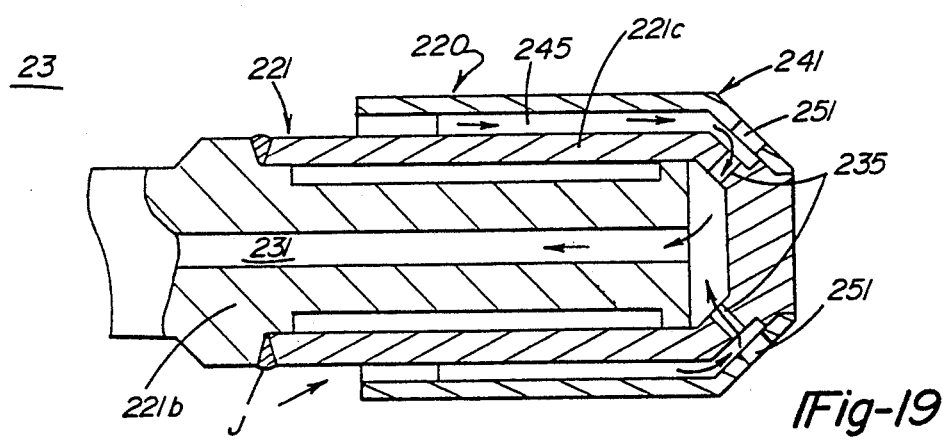
FIG. 19 is an enlarged sectional view of the "fuel-pusher" radial jet fuel injector of FIG. 17.
Figure 20:
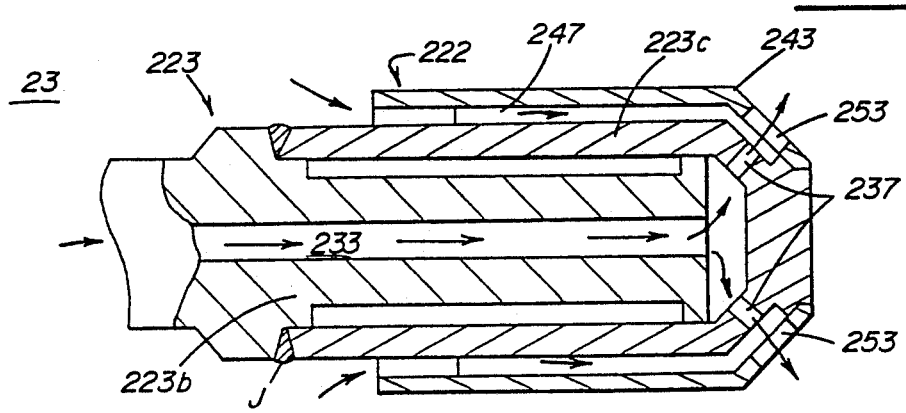
FIG. 20 is an enlarged sectional view of the "fuel-puller" radial jet fuel injector of FIG. 17.

The first and second fuel injectors 220,222 are of like construction with the important exception that one fuel injector (e.g., the first fuel injector 220) is constructed to function as a so-called "fuel-pusher" fuel injector and the other fuel injector (e.g., the second fuel injector 222) is constructed to function as a so-called "fuel-puller" fuel injector in cooperation with air discharged from air injectors 227,229 in order to establish a pneumatic pressure differential on the fuel residing between respective first and second fuel discharge openings 251,253 (fuel discharge means) of sufficient magnitude in order to purge fuel in the respective fuel injectors 220,222 as well as in fuel conduits 46 to the combustor 12 when the injectors 220,222 are rendered non-operative during the lower power regime of engine operation (e.g., during engine idle operation) or when the supply of fuel thereto is otherwise interrupted. For example, the arrows in FIGS. 17 and 19-20 illustrate the direction of fuel purging as a result of the pressure differential established. These aspects of the fuel injectors 220,222 will be described further hereinbelow.

The first and second fuel injectors 220,222 comprise respective inlet fittings 260,262 to which the ends of the fuel conduits 46 are welded, brazed or otherwise fastened for supplying fuel to the injectors. Each fitting includes a trim orifice 264,266 which are used in conventional manner to provide generally the same fuel flow rate to each of the injectors 220,222. The fuel supplied to the injectors 220,222 flows through respective fuel inlet pipes 270,272 disposed in the injector bodies 221,223 as shown to provide an insulating air space about each inlet pipe 270,272. A thermal shield 281,283 is disposed about each injector bodies 221,223 to this same end.

The fuel flows from the inlet pipes 270,272 through the respective fuel discharge passages 231,233 in the respective injector bodies 221,223 for discharge from the respective downstream annular array of circumferentially spaced fuel discharge openings 235,237 communicated to the combustor 12 via the swirlers 227,229.

The first and second air discharge swirlers (air injectors) 227,229 are cooperatively associated or disposed to the respective fuel injectors 220,222. In particular, the fuel discharge ends 28,30 of the fuel injectors are received in respective central upstream openings in air swirlers 227,229 as shown such that the cap fuel discharge openings 251,253 are located in the inner air discharge passages 300,302 of the air swirlers 227,229 as shown in FIG. 17. The air discharge swirlers (air injectors) 227,229 include the respective central, inner air discharge passages 300,302 for discharging pressurized air from respective downstream, annular inner air discharge lips 310,312 (air discharge means) communicated to the combustor 12. The air swirlers 227,229 also include outer, annular air discharge passages 320,322 for discharging pressurized air from respective downstream, annular outer air discharge lips 324,325.

Figure 22:
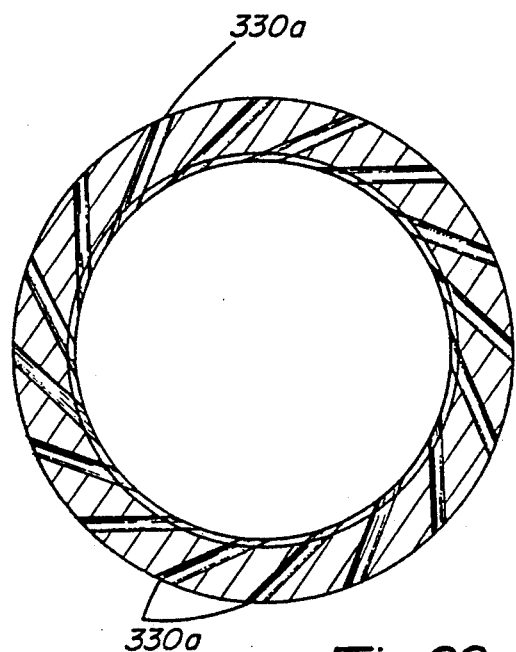
FIGS. 22 and 23 are cross-sectional views of the inner and outer air inlet rings of the air discharge swirler (air injector) of FIG. 21.
Figure 23:
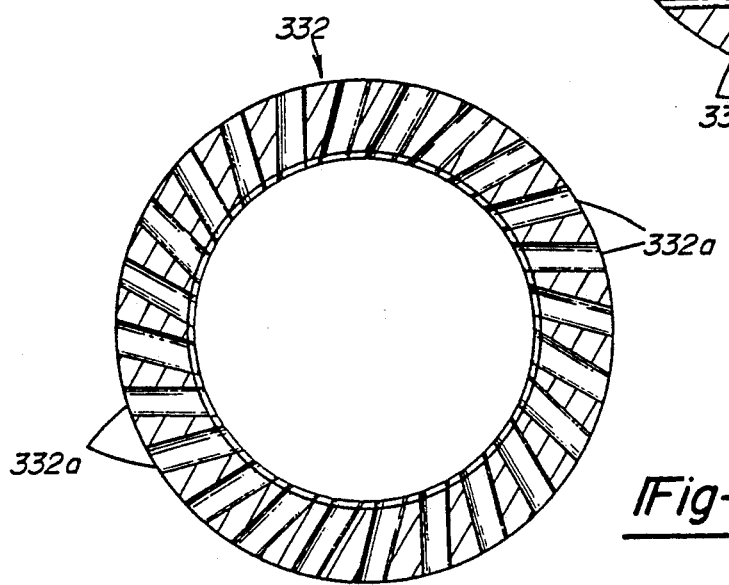

The inner and outer air discharge passages 300,320 of swirler 227 receive compressor discharge air from plenum 23 via air swirler rings 330,332. Each air swirl ring 330,332 includes a plurality of circumferentially spaced swirl passages 330a,332a (FIGS. 22-23) for imparting swirl to the air flowing therethrough from the plenum 23 to the inner and outer air discharge passages 300,320. The inner and outer air discharge passages 302,322 of swirler 229 receive compressor discharge in the same way since the swirlers 227,229 are identical in construction. The swirl passages 330a,332a of each swirler 227,229 provide an aggregate effective air flow area of about 0.40 in² for each swirler.

As mentioned hereinabove, the first fuel injector 220 is constructed to function as a so-called fuel-pusher fuel injector and the second fuel injector 222 is constructed as a so-called fuel-puller fuel injector in response to air discharged from air injectors 227,229 in order to establish a pneumatic pressure differential (static air pressure differential) on the fuel residing in the fuel injectors between the respective first and second fuel discharge openings 251,253 (fuel discharge means) of sufficient magnitude to purge the resident fuel (i.e., fuel residing in the fuel discharge passages 231,233 as well as in the fuel conduits 46) when the injectors 220,222 are rendered non-operative during the lower power regime of engine operation (e.g., during engine idle operation) or when the supply of fuel thereto is otherwise interrupted.

Referring to FIGS. 19-20, the first and second fuel injectors 220,222 are shown including the respective cap fuel discharge opening 251,253 which differ in size (i.e., diameter) in order to establish the desired pressure differential thereat as shown in FIG. 26 for the inner and outer air velocities provided in the inner air passages 300,302 and outer air discharge passages 320,322 (e.g., as a result from the pressure drop across the combustor). The air-pressure $\Delta P$ values are set forth on the abscissa of FIG. 26 while the resulting static air pressure values at the fuel discharge openings 251,253 are set forth on the ordinate of FIG. 26. It is apparent from FIG. 26 that the measured air pressure (line designated D- FIG. 19 and C- FIG. 20) at the fuel discharge openings 251 of the fuel-pusher injector 220 is positive in the range of the air velocity values used while the measured air pressure at the fuel discharge openings 253 of the fuel-puller injector 222 is less positive. The pneumatic pressures were measured at sea level pressure using a U-tube water manometer with no fuel flowing through the fuel passages/openings of the injectors.

The geometric configuration of the fuel discharge passages 231,233 and fuel discharge openings 235,237 were the same for injectors 220,222. For example, the passages 231,233 and openings 235,237 were 0.180 and 0.026 inch in nominal diameter, respectively. However, the nominal diameter of fuel discharge openings 251 was smaller than the nominal diameter of fuel discharge openings 253 (e.g., 0.052 inch versus 0.079 inch). As mentioned, the air discharge swirlers (air injectors) 227,229 are identical in construction for fuel injectors 220,222 for the pneumatic pressures measured and shown on FIG. 26.

The pneumatic pressure differential established at the fuel discharge openings 251,253 is sufficient to cause injector 220 to function as a fuel-pusher injector and to cause injector 222 to function as a fuel-puller injector when fuel flow is interrupted to the injectors 220,222 in the range of air flow velocities provided by swirlers 227,229, whereby the fuel in the fuel injectors and in the conduits 46 is subjected to a differential pneumatic pressure that is effective to purge the fuel in the direction of arrow P in FIG. 17 into the combustor 12 through the fuel discharge openings 253 which has the lesser static pressure thereat. Moreover, the purging of fuel in the fuel discharge passages 231,233 and in the conduits 46 occurs rapidly enough after fuel flow is shut off by the shut-off valve 51 (in response to reduced fuel flow by the distribution valve 40) to cause the purged fuel to be ignited and combusted by the combustion flame region sustained by the fuel previously discharged from the fuel injectors 220,222 and air discharge swirlers (air injectors) 227,229 prior to the valve 51 being closed. The time required for complete purging of the resident fuel may be varied by controlling the magnitude of the pressure differential established on the resident fuel.

As a result, the gas turbine engine can be operated in a staged manner wherein the fuel injectors 220,222 are supplied fuel by the distribution valve 40 and open shut-off valve 51 as required during a high power regime of engine operation to render the injectors operative to sustain a supplemental combustion flame region in the combustor 12 for increased power. When the engine is to be operated at a lower power regime (e.g., idle or high altitude descent), the distribution valve fuel 40 will be actuated to reduce fuel flow to the injectors 220,222 to an extent that causes the shut-off valve 51 to close and render the injectors 220,222 subsequently non-operative to supply supplemental fuel to the combustor 12. When the injectors 220,222 are rendered non-operative to provide staged fuel flow, the pneumatic pressure differential is established by fuel and air injectors 220,222 and 227,229 on the fuel residing in the injectors 220,222 and conduits 46 (between the fuel discharge openings 251,253) effective to purge the resident fuel in the fuel passages 231,233 and the isolated conduits 46 into the combustor 12 rapidly enough to ignite the purged fuel by the preexisting flame region for combustion in the combustor. Emissions from the engine otherwise attributable to dumping of raw fuel into the combustor when the injectors 220,222 are rendered non-operative are substantially reduced. Moreover, coking of fuel that would otherwise reside in the fuel discharge passages 231,233 is substantially avoided.

Although the invention has been described hereinabove with respect to certain fuel injector constructions to render injector 220 a fuel-pusher injector and injector 222 a fuel-puller injector, the invention is not so limited. For example, FIG. 24 (wherein like features are represented by like reference numerals) illustrate an alternative puller fuel injector construction usable in practicing the invention. In lieu of cap member 243, a sleeve 355 is used that includes an annular, upstream end wall 355a to prevent plenum air from flowing therepast and a shortened end 355b that leaves fuel discharge openings 237 of the fuel injector 222 exposed. The pneumatic pressure measured at the fuel discharge openings 237 of this fuel-puller injector is shown in FIG. 26 (see line designated A-FIG. 26) as determined under the same test conditions described above. It is apparent that a negative pressure is present at the fuel discharge openings 237.

The different pressures needed to purge the fuel injectors 220,222 can be established by using fuel-pusher/-less pusher injectors; fuel-pusher/puller injectors; or fuel-puller/less puller injectors having their fuel discharge passages in fuel flow communication. The magnitude of the pressure differential established between the fuel discharge openings 251,253 for the embodiment of FIGS. 17-20 generally depends on the geometric size of these openings, air flow dynamics in the immediate vicinity of these openings and the plenum (supply) air pressure level. The same is true in another embodiment of the invention where injector 220 of FIG. 17 and injector 222 of FIG. 24 are coupled or connected in the manner shown in FIG. 17. That is, the magnitude of the pressure differential established between the fuel discharge openings 251 (FIGS. 17,19), and 237 (FIG. 24) depends on the aforementioned factors.

Moreover, although less preferred, different air discharge characteristics from the air swirlers (air injectors) 227,229 relative to the respective first and second injectors 220,222 may be used to establish a pressure differential on the resident fuel to purge it to the combustor. For example, referring to FIG. 26, the line designated B-FIG. 26 represents the static pressure measured at fuel discharge openings 237 of the fuel injector shown in FIG. 24 under the same test conditions with the exception that a smaller air swirler (not shown) having an effective airflow area of 0.130 in² was used with the fuel injector rather than the air swirler 229 shown and described with respect to FIGS. 17, 21-23 having an effective air flow area of 0.40 in². The smaller air swirler is similar in construction to air swirler 229 but provides an aggregate effective air flow area of only 0.130 in² through the inner and outer swirl passages that are similar to swirl passages 330a,332a of FIGS. 22-23. By comparing the lines designated A-FIG. 26 and B-FIG. 26, it can be seen that use of the smaller effective air flow area swirler with the fuel injector 222 of FIG. 24 provides a positive static pressure at the fuel discharge openings 237. This contrasts to the negative static pressure measured at the fuel discharge openings 237 of a like fuel injector 222 (FIG. 24) used with the larger effective air flow swirler (FIGS. 17, 21-23). Thus, the fuel injector of FIG. 24 functions as a "puller" fuel injector when used with the larger effective area air swirler 229 but functions as a "pusher" fuel injector when used with a smaller effective air flow area swirler.

Figure 21:
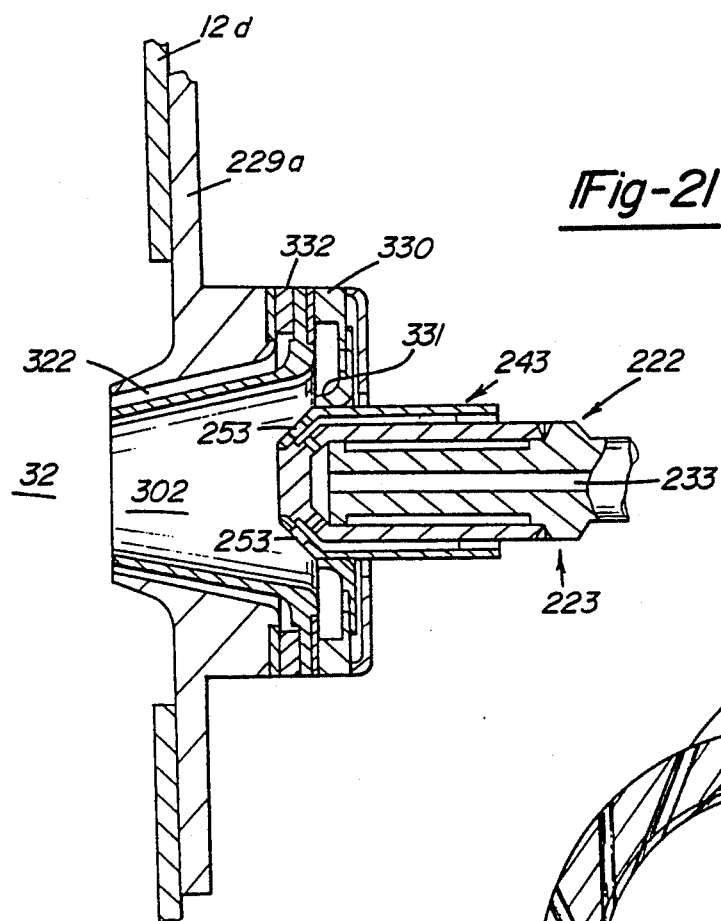
FIG. 21 is an enlarged view of the "fuel-puller" radial jet fuel injector and its associated air discharge swirler.

FIG. 25 illustrates another embodiment of the invention where the tubular cap members 241,243 are replaced with an alternative cap member 261 that includes an outer peripheral lip 263 that is fastened to the annular wall 331 of the swirler 227 (or 229), FIG. 21. The wall 331 is spaced from the injector body 221 (or 223) to form the air passage 245(247) for conducting pressurized air.

The present invention has been described hereinabove with respect to the first and second fuel injectors comprising secondary (or main) fuel injectors of a staged fuel injector system of a gas turbine engine to supply fuel to the combustor during the high power (e.g., high speed) regime of engine operation while pilot fuel injectors provide fuel for both the lower power regime (e.g., lower idle speed) and high power engine operation. However, the invention is not so limited. For example, the pilot fuel injectors referred to above maybe similar to the interconnected fuel injectors 20,22 (220,222) so that resident fuel is purged from the pilot fuel injectors to the combustor 12 in the event of an unintentional interruption in supply of the pilot fuel thereto during operation of the engine by virtue of establishment of the aforementioned fuel pressure differential between the fuel discharge lips of the injectors.

In general, the interconnected fuel injectors 20,22 (220,222) may be used in other instances in a fuel injector system where there is a need to purge fuel from the fuel discharge means in the event of an intentional or unintentional interruption in the supply of fuel to the injectors.

While certain specific embodiments of the invention have been described in detail hereinabove, it is not intended to be limited thereto but rather only to the extent set forth hereafter in the claims which follow.

We claim:

1. A method of fueling a combustor of a gas turbine engine, comprising,
   supplying fuel to first and second fuel discharge means said first and second fuel discharge means being connected in fuel flow relation and communicated to the cumbustor for discharge of fuel to the combustor for sustaining a flame region in the combustor, supplying pressurized air to first and second air injector means cooperatively associated with the respective first and second fuel discharge means for discharge to the combustor for sustaining said flame region, and
   establishing different pneumatic pressures at the first and second fuel discharge means during discharge of the pressurized air to the combustor such that, in the event of interruption in the fuel supply to the first and second fuel discharge means during operation of the engine, the different pneumatic pressures established at the first and second fuel discharge means subject fuel residing therebetween to a pressure differential effective to purge the resident fuel into the combustor rapidly enough for the purged fuel to be ignited by said flame region.

2. The method of claim 1 including interconnecting said first and means in fuel flow relation by conduit means such that the fuel residing in the conduit means is purged therefrom in the event the fuel supply is interrupted.

3. The method of claim 2 including interrupting fuel flow to the conduit means to render the first and second fuel discharge means non-operative.

4. A method of fueling a combustor of a gas turbine engine, comprising, supplying fuel to interconnected first and second fuel discharge means during a high power regime of engine operation to render said fuel discharge means operative to discharge fuel to the combustor for sustaining a flame region in the combustor, supplying pressurized air to first and second air injector means cooperatively associated with the respective first and second fuel discharge means during the high and lower power regimes of engine operation for sustaining said flame region, establishing different pneumatic pressures at the first and second fuel discharge means during discharge of the pressurized air to the combustor such that, when the fuel supply to the first and second fuel discharge means is interrupted during a lower power regime of engine operation to render said fuel discharge means non-operative, the different pneumatic pressures established at the first and second fuel discharge means subject the fuel residing therebetween to a pressure differential effective to purge the resident fuel into the combustor rapidly enough for the purged fuel to be ignited by said flame region.

5. The method of claim 4 including interconnecting said first and second fuel discharge means in fuel flow relation by conduit means such that the fuel residing in the conduit means is purged therefrom in the event the fuel supply is interrupted.

6. The method of claim 5 including interrupting fuel flow to the conduit means when the first and second fuel discharge means are rendered non-operative.

* * * * *

UNITED STATES PATENT AND TRADEMARK OFFICE
CERTIFICATE OF CORRECTION

PATENT NO. : 5,329,760

DATED : July 19, 1994

INVENTOR(S) : Jerome R. Bradley, et al.

It is certified that error appears in the above-indentified patent and that said Letters Patent is hereby corrected as shown below:

On the title page, item [57], after the last sentence add;

---When the fuel injectors are rendered non-operative, different pneumatic pressures are established at the fuel discharge lips to purge fuel from the fuel injectors to the combustor.---

Column 18, line 41; change "means said first" to

---means, said first---.

line 43; change "to the cumbustor" to

---to the combustor---.

line 62; change "first and means" to

---first and second fuel discharge means---.

Column 20, line 15; change "means when the" to

---means to render the---.

Column 20, line 16; change "discharge means are rendered non-operative" to

UNITED STATES PATENT AND TRADEMARK OFFICE
CERTIFICATE OF CORRECTION

PATENT NO. : 5 329 760

DATED : July 19, 1994

INVENTOR(S) : Jerome R. Bradley, et al.

It is certified that error appears in the above-indentified patent and that said Letters Patent is hereby corrected as shown below:

---discharge means non-operative---.

Signed and Sealed this

Twenty-fifth Day of October, 1994

Attest:

BRUCE LEHMAN

*Attesting Officer*      *Commissioner of Patents and Trademarks*